US010372538B2

(12) United States Patent
Chiba et al.

(10) Patent No.: US 10,372,538 B2
(45) Date of Patent: Aug. 6, 2019

(54) COMPUTER SYSTEM

(71) Applicant: HITACHI, LTD., Tokyo (JP)

(72) Inventors: Takeru Chiba, Tokyo (JP); Hiroaki Akutsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 115 days.

(21) Appl. No.: 15/554,291

(22) PCT Filed: Mar. 6, 2015

(86) PCT No.: PCT/JP2015/056663
§ 371 (c)(1),
(2) Date: Aug. 29, 2017

(87) PCT Pub. No.: WO2016/142998
PCT Pub. Date: Sep. 15, 2016

(65) Prior Publication Data
US 2018/0081757 A1    Mar. 22, 2018

(51) Int. Cl.
*G06F 11/00* (2006.01)
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0665* (2013.01); *G06F 3/0689* (2013.01)

(58) Field of Classification Search
None
See application file for complete search history.

(56) References Cited

U.S. PATENT DOCUMENTS

| 5,258,984 A | 11/1993 | Menon et al. |
| 2008/0005612 A1 | 1/2008 | Arai |
| 2009/0125680 A1* | 5/2009 | Ninose .................. G06F 3/0608 711/114 |

(Continued)

FOREIGN PATENT DOCUMENTS

| JP | 5-100960 A | 4/1993 |
| JP | 2000-200157 A | 7/2000 |

(Continued)

OTHER PUBLICATIONS

International Search Report for WO 2016/142998 A1, dated May 26, 2015.

*Primary Examiner* — Daniel F. McMahon
(74) *Attorney, Agent, or Firm* — Volpe and Koenig, P.C.

(57) ABSTRACT

A virtual parity group including virtual storage drives is formed. A redundant data set is stored in a virtual stripe array including virtual stripes that are virtual storage regions of a prescribed size of the respective virtual storage drives constituting the virtual parity group. The virtual stripes of the virtual stripe array are mapped to different physical storage drives, respectively. Virtual chunks including one or more virtual stripe arrays formed in the virtual parity group. Physical parity groups including the physical storage drives are formed. The virtual stripes of the virtual chunks in a distributed manner are mapped to the physical parity groups. One or more virtual chunks are selected from among the virtual chunks. Storage regions corresponding to the selected one or more virtual chunks are converted to spare regions in the physical storage region.

15 Claims, 31 Drawing Sheets

(56) References Cited

U.S. PATENT DOCUMENTS

| | | | | |
|---|---|---|---|---|
| 2011/0191536 A1* | 8/2011 | Mizuno | ............... | G06F 3/0611 |
| | | | | 711/114 |
| 2011/0197023 A1* | 8/2011 | Iwamitsu | .............. | G06F 3/0604 |
| | | | | 711/114 |
| 2013/0205070 A1* | 8/2013 | Koseki | ................. | G06F 3/0616 |
| | | | | 711/103 |
| 2015/0324145 A1* | 11/2015 | Akutsu | ................ | G06F 3/0617 |
| | | | | 711/114 |
| 2017/0024142 A1* | 1/2017 | Watanabe | ................ | G06F 3/06 |

FOREIGN PATENT DOCUMENTS

| JP | 2008-009767 A | 1/2008 |
|---|---|---|
| WO | 2014/115320 A1 | 7/2014 |

\* cited by examiner

BEFORE CONVERSION OF DATA REGION TO SPARE REGION

AFTER CONVERSION OF DATA REGION TO SPARE REGION

| Pool# (1000) | Tier# (1001) | DG# (1002) | VPG# (1003) |
|---|---|---|---|
| 0 | 0 | 0 | 0 |
| | | | ... |
| | | | 3 |
| | 1 | 1 | 8 |
| | | | ... |
| | | | 23 |
| | | 2 | 32 |
| | | | ... |
| | | | 63 |
| 1 | 0 | 3 | 96 |
| | | | ... |
| | | | 127 |

POOL MANAGEMENT TABLE 801

*FIG. 10A*

| DG# (1004) | VSD# (1005) | PPG# (1006) | PCDEV# (1007) | STATE (1008) | COPY POINTER (1009) |
|---|---|---|---|---|---|
| 0 | 0 | 1 | 3 | IN USE | 0x00000300 |
| | ... | ... | ... | ... | ... |
| | 3 | NaN | NaN | UNUSED | NaN |
| 1 | 4 | NaN | NaN | UNUSED | NaN |
| | 5 | NaN | NaN | UNUSED | NaN |
| | 6 | NaN | NaN | UNUSED | NaN |
| 2 | 7 | NaN | NaN | UNUSED | NaN |

VIRTUAL SPARE MANAGEMENT TABLE 802

*FIG. 10B*

| DG# 1100 | IN-USE Vcycle# 1101 | CONVERTED SPARE Vcycle# 1102 |
|---|---|---|
| 0 | 5 | NaN |
| 1 | 4 | 30 |
| 2 | NaN | NaN |
| ... | ... | ... |
| 10 | 10 | 28 |
| ... | ... | ... |

CONVERTED SPARE REGION MANAGEMENT TABLE 803a

FIG. 11A

| PPG# 1103 | PCDEV# 1104 | STATE 1105 |
|---|---|---|
| 0 | 0 | NORMAL |
|  | 1 | INACCESSIBLE |
|  | ... | ... |
|  | 7 | NORMAL |
| 1 | 0 | NORMAL |
|  | 1 | NORMAL |
|  | ... | ... |
|  | 7 | NORMAL |

DRIVE STATE MANAGEMENT TABLE 804

FIG. 11B

| Pool# | VVOL# | VVOL Page# | VPG# | VPG Page# |
|---|---|---|---|---|
| 0 | 1 | 0 | 1 | 0 |
| | | 1 | 1 | 1 |
| | | 2 | 1 | 33 |
| | | 3 | NOT ALLOCATED | NOT ALLOCATED |
| | | ... | ... | ... |
| | 2 | 0 | 2 | 0 |
| | | 1 | 2 | 3 |
| | | ... | ... | ... |
| 1 | 3 | 0 | 3 | 2 |
| | 4 | 0 | 4 | 9 |

PAGE MAPPING TABLE 805

*FIG. 12A*

| VVOL# | PRIORITY LEVEL | VPG# |
|---|---|---|
| 1 | 0 | 2 |
| | 1 | 0 |
| | 2 | 1 |
| | 3 | 3 |
| | ... | ... |
| 2 | 0 | 4 |
| | 1 | 2 |
| | ... | ... |

PAGE ALLOCATION PRIORITY TABLE 806

*FIG. 12B*

| VSD# | Pcycle# (SPARE ORIGIN) | PPG# | PCDEV# | Pcycle# (SPARE DESTINATION) |
|---|---|---|---|---|
| 0 | 0 | 1 | 2 | 0 |
| 0 | 1 | 0 | 0 | 0 |
| 0 | 2 | 2 | 2 | 0 |
| ... | ... | ... | ... | ... |
| 1 | 0 | NULL VALUE | NULL VALUE | NULL VALUE |
| 1 | 1 | NULL VALUE | NULL VALUE | NULL VALUE |
| 1 | 2 | NULL VALUE | NULL VALUE | NULL VALUE |
| ... | ... | ... | ... | ... |

SPARE CONVERSION TABLE 811

*FIG. 13A*

| PPG# | PCDEV# | Pcycle# (SPARE DESTINATION) | VSD# | Pcycle# (SPARE ORIGIN) |
|---|---|---|---|---|
| 0 | 0 | 0 | 1 | 2 |
| 0 | 0 | 1 | NULL VALUE | NULL VALUE |
| 0 | 0 | 2 | NULL VALUE | NULL VALUE |
| ... | ... | ... | ... | ... |
| 0 | 1 | 0 | 0 | 1 |
| 0 | 1 | 1 | NULL VALUE | NULL VALUE |
| ... | ... | ... | ... | ... |
| 1 | 0 | 0 | 1 | 1 |
| 1 | 0 | 1 | 0 | 2 |
| ... | ... | ... | ... | ... |

SPARE INVERSE CONVERSION TABLE 812

*FIG. 13B*

BEFORE CONVERSION OF EMPTY REGION TO SPARE REGION

AFTER CONVERSION OF EMPTY REGION TO SPARE REGION

BEFORE CONVERSION OF EMPTY REGION TO SPARE REGION

AFTER CONVERSION OF EMPTY REGION TO SPARE REGION

| 2501 | 2502 | 2503 |
|---|---|---|
| DG# | VPG# | STATE |
| 0 | 0 | FOR DATA |
| | 1 | FOR DATA |
| | 2 | FOR SPARE |
| | ... | ... |
| 1 | 16 | FOR DATA |
| | 17 | FOR SPARE |
| | 18 | FOR DATA |
| CONVERTED SPARE REGION MANAGEMENT TABLE 803b | | |

*FIG. 25*

BEFORE CONVERSION OF EMPTY REGION TO SPARE REGION

AFTER CONVERSION OF EMPTY REGION TO SPARE REGION

BEFORE CONVERSION OF EMPTY REGION TO SPARE REGION

AFTER CONVERSION OF EMPTY REGION TO SPARE REGION

COMPUTER SYSTEM

BACKGROUND

The present invention relates to a computer system.

Conventionally, a plurality of storage apparatuses in a storage system constitute a RAID (Redundant Array of Inexpensive Disks) group, and logic volumes created on the basis of the RAID group can be provided on a host computer.

As a technique pertaining to RAID, Patent Document 1 discloses the technique of providing a small and long lasting system that maintains fault tolerance without exchanging disks and without installing multiple spare disks, by creating an empty drive by modifying the RAID level and handling the empty drive as a new spare disk.

Patent Document 2 discloses a so-called distributed RAID in which stripe columns including normal data and redundant data for recovering the normal data are managed in a distributed manner across a plurality of storage apparatuses that provide storage regions in a capacity pool.

PATENT DOCUMENTS

Patent Document 1: US Patent Application Publication No. 2008/005612 A1

Patent Document 2: WO 2014/115320 A1

SUMMARY

In general, if a fault has occurred in any of the drives constituting the RAID group in which redundant data is being stored, the redundant data and the like are used in order to rebuild the data stored in the drive where the fault occurred in a spare drive provided in the apparatus.

In recent years, in order to achieve a balance between increasing storage capacity in the storage system and reducing costs, there has been increased deployment of high capacity and low cost drives such as SATA (Serial ATA) drives or NL-SAS (Near Line-Serial Attached SCSI) drives. However, these drives are generally less reliable than drives aimed at enterprise applications such as existing FC (Fibre Channel) drives and SAS drives, and thus, there is a high probability that a multitude of drive faults would result in a lack of spare drives.

In order to rebuild data amid a lack of spare drives, storage apparatus maintenance workers need to add spare drives or, after replacing failed drives with functional drives, perform a copy-back process, which raises the concern of increased man-hours for maintaining the apparatus. The copy-back process is a process of copying data from a spare drive to an operational drive after replacement. In the method disclosed in Patent Document 2, the spare region is allocated in a fixed manner, which means that the aforementioned problem is not addressed.

Also, the increased capacity of the drive can result in a decrease in reliability due to an increased amount of time required for rebuilding data. The method disclosed in Patent Document 1 is based on an existing RAID technique, and therefore does not address the problem of lengthened rebuild time. Also, the process overhead associated with modifying the RAID level is high, which means time is required to attain a spare region.

Effects of the Invention

A representative example according to the present invention is a computer system that provides a virtual volume to a host, including: an interface configured to transmit and receive data with the host through a network; and a control unit configured to control access to a physical storage drive from the host through the interface, wherein the control unit is configured to manage first mapping information between the virtual volume and a virtual storage region on a virtual storage drive, and second mapping information between the virtual storage region and a physical storage region provided by the physical storage drive, and convert access to the virtual volume to access to the physical storage region according to the first mapping information and the second mapping information, form a virtual parity group including a plurality of virtual storage drives, store a redundant data set in a virtual stripe array including virtual stripes that are virtual storage regions of a prescribed size of the respective plurality of virtual storage drives constituting the virtual parity group, map the virtual stripes of the virtual stripe array to different physical storage drives, respectively, form virtual chunks including one or more virtual stripe arrays in the virtual parity group, form a plurality of physical parity groups including a plurality of the physical storage drives, map the virtual stripes of the virtual chunks in a distributed manner to the plurality of physical parity groups, select one or more virtual chunks from among the virtual chunks, and convert storage regions corresponding to the selected one or more virtual chunks to spare regions in the physical storage region.

According to one aspect of the present invention, the process of attaining a spare region can be performed more efficiently.

BRIEF DESCRIPTION OF THE DRAWINGS

FIG. 10A shows a pool management table of the computer system of Embodiment 1

FIG. 10B shows a virtual spare management table of the computer system of Embodiment 1.

FIG. 11A shows a converted spare region management table of the computer system of Embodiment 1.

FIG. 11B show a drive state management table of the computer system of Embodiment 1.

FIG. 12A shows the page mapping table of the computer system of Embodiment 1.

FIG. 12B shows the page allocation priority table of the computer system of Embodiment 1.

FIG. 13A shows a spare conversion table of the computer system of Embodiment 1.

FIG. 13B shows a spare inverse conversion table of the computer system of Embodiment 1.

FIG. 25 shows a converted spare region management table of the computer system of Embodiment 2.

DETAILED DESCRIPTION OF EMBODIMENTS

A few embodiments of the present invention will be described below with reference to the drawings. The embodiments described below do not limit the invention according to the claims, and various elements described in the embodiments and a combination thereof are not all necessarily required as a solution provided by the invention.

In the description below, various information is described with the expression "aaa table", but the various information may be expressed with a data structure other than a table. In order to express the fact that the type of data structure does not matter, the phrase "aaa information" may be used to signify "aaa table".

In the description below, the process is sometimes described as being performed by the program, but the program, by being executed by a processor (such as a CPU (Central Processing Unit)), performs a set process while appropriately using storage resources (such as memory) and/or a communication interface device (such as a port), and thus, the process may be thought of as being performed by the program. The processes described as being performed by the program may be thought of as being performed by the processor or by a computer having the processor (such as a management computer, a host computer, or a storage apparatus).

Also, the controller may be the processor itself, or may include a hardware circuit that performs some or all of the processes performed by the controller. The program may be installed in each controller from a program source. The program source may be a program distribution server or a storage medium, for example.

Figure 1A:
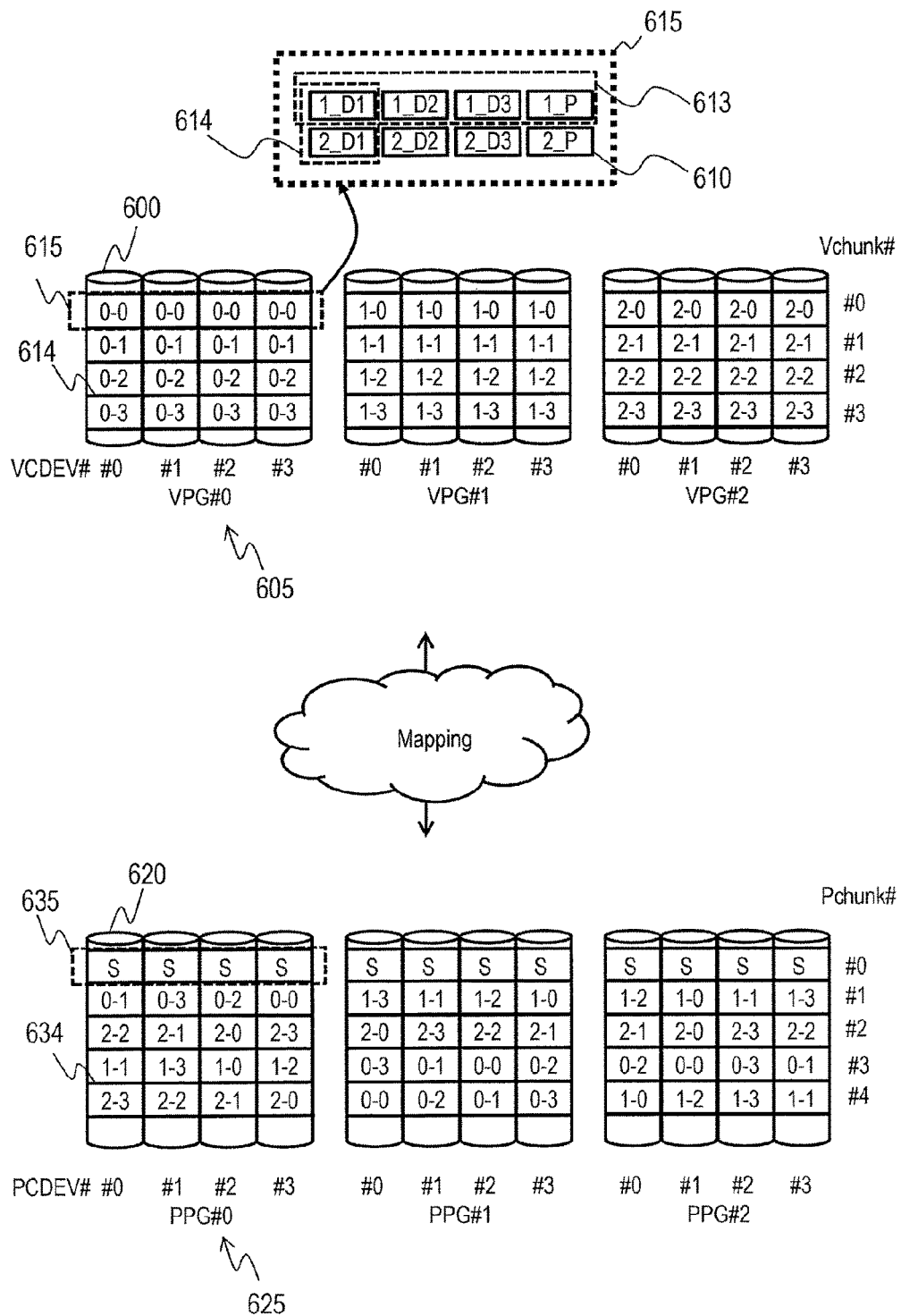
FIG. 1A shows a summary of the present disclosure.

FIG. 1A shows a schematic view of the mapping between virtual storage regions and physical storage regions in a computer system to be disclosed below. The storage apparatus provides a virtual volume to the host, and allocates to the virtual volume virtual storage regions provided by virtual storage drives 600 (VCDEV: Virtual Column DEVice). In FIG. 1A, 12 virtual storage drives 600 are shown, and each is allocated a VCDEV#.

Furthermore, a virtual parity group 605 (VPG) is constituted of the plurality of virtual storage drives 600. In FIG. 1A, four virtual storage drives 600 constitute one virtual parity group 605. In FIG. 1A, three virtual parity groups 605 are shown, and each is assigned a VPG#.

The virtual parity groups 605 constitute a RAID (Redundant Array of Inexpensive Disks), and store redundant data sets. The redundant data sets are data sets for rebuilding data in the RAID, and are constituted of data units and redundant data from the host.

The virtual storage region is divided into virtual stripes 610 of a prescribed size. The virtual stripes 610 of the virtual storage drive 600 in the virtual parity group 605 constitute a virtual stripe array 613. In the example of FIG. 1A, four virtual stripes 610 constitute one virtual stripe array 613. The virtual stripe array 613 stores a redundant data set. Each virtual stripe 610 of the virtual stripe array 613 stores data D or a parity P from the host in the redundant data set.

One or a prescribed number of consecutive virtual stripes 610 in one virtual storage drive 600 constitute one virtual parcel 614. In the example of FIG. 1A, the virtual stripes 610 constitute one virtual parcel 614.

Furthermore, a prescribed number of consecutive virtual stripe arrays 613 constitute a virtual chunk 615 (Vchunk). The virtual chunk 615 is constituted of virtual parcels 614 of respective virtual storage drives 600 of one virtual parity group 605.

In FIG. 1A, one virtual chunk 615 is constituted of two virtual stripe arrays 613. One virtual chunk 615 is one parcel array. In FIG. 1A, 12 virtual chunks 615 are shown, and each is allocated a Vchunk#. If the virtual parcel 614 is constituted of one virtual stripe 610, then the virtual chunk 615 is constituted of one virtual stripe array 613. The number in each virtual parcel 614 indicates a pair including the VPG# and Vchunk#.

The virtual storage region is mapped to a physical storage region provided by a physical storage drive 620 (PCDEV: Physical Column DEVice). In FIG. 1A, 12 physical storage drives 620 are shown, and each is allocated a PCDEV#. A physical parity group 625 (PPG) is constituted of the plurality of physical storage drives 620. In FIG. 1A, four physical storage drives 620 constitute one physical parity group 625. In FIG. 1A, three physical parity groups 625 are shown, and each is allocated a PPG#.

One virtual parcel 614 is mapped to a physical parcel 634 in the physical storage region. The number in each physical parcel 634 indicates a pair including the VPG# and Vchunk# of the mapped virtual parcel 614, and "S" indicates the spare region.

Figure 15:
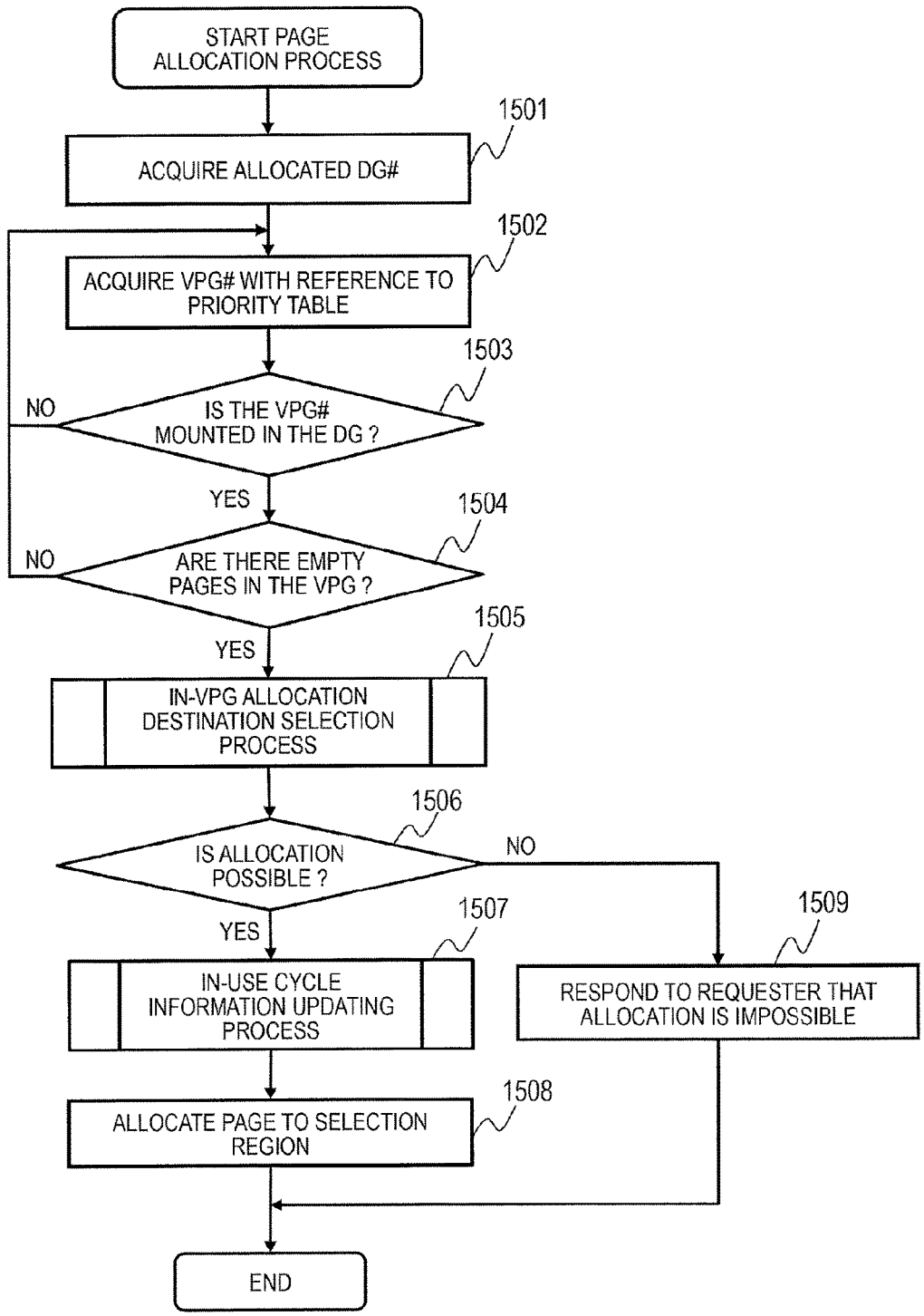
FIG. 15 shows the page allocation process of the computer system of Embodiment 1.

Similar to the virtual chunk 615, a physical chunk 635 (Pchunk) is configured in the physical storage region. The physical chunk 635 is constituted of physical parcels 634 of respective physical storage drives 620 of one physical parity group 625. In FIG. 1A, 15 physical chunks 635 are shown, and each is allocated a Pchunk#. Each physical chunk 635 is identified by the Pchunk# and the PPG#.

In FIG. 1A, the virtual parcels 614 of each virtual chunk 615 are mapped to different physical storage drives 620 in order to recover from faults. In other words, the virtual stripes 610 constituting each virtual stripe array 613 are also mapped to different physical storage drives 620.

The virtual parcels 614 constituting each virtual chunk 615 are mapped in a distributed fashion to the plurality of physical parity groups 625. In other words, the virtual stripes 610 constituting each virtual chunk 615 are mapped in a distributed fashion to the plurality of physical parity groups 625. In this manner, load concentration during I/O access processes is reduced. The plurality of virtual parcels 614 (virtual stripes 610) of the virtual chunk 615 can be disposed in one physical parity group 625.

In the physical storage region, a physical chunk 635 of a prescribed Pchunk# is allocated to the spare region, and in the example of FIG. 1A, the physical chunk 635 with a Pchunk# of 0 is allocated to the spare region.

In the computer system of the present disclosure, an empty region within the data storage region for storing redundant data sets is secured in the physical storage region, and the empty region is converted to a new spare region. The computer system selects one or more virtual chunks 615 in the virtual storage region, and converts the virtual chunk and the physical storage region mapped to the virtual chunk to a spare region. In this manner, it is possible to convert the physical storage region disposed in a distributed manner among the physical storage regions.

Figure 1B:
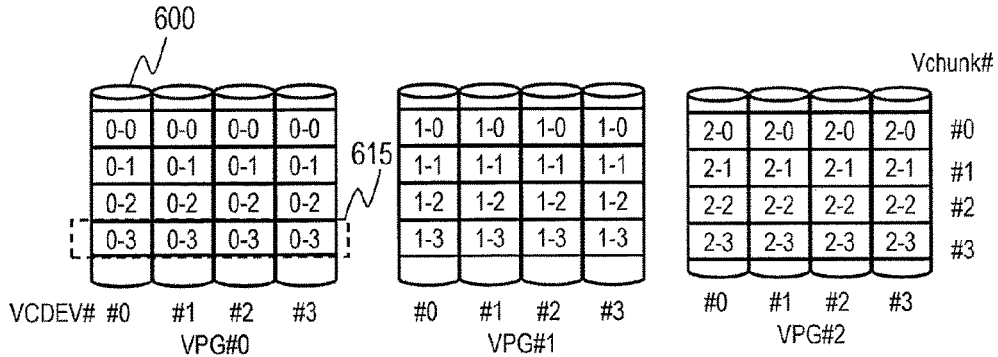
FIG. 1B shows the summary of the present disclosure.
Figure 1B:
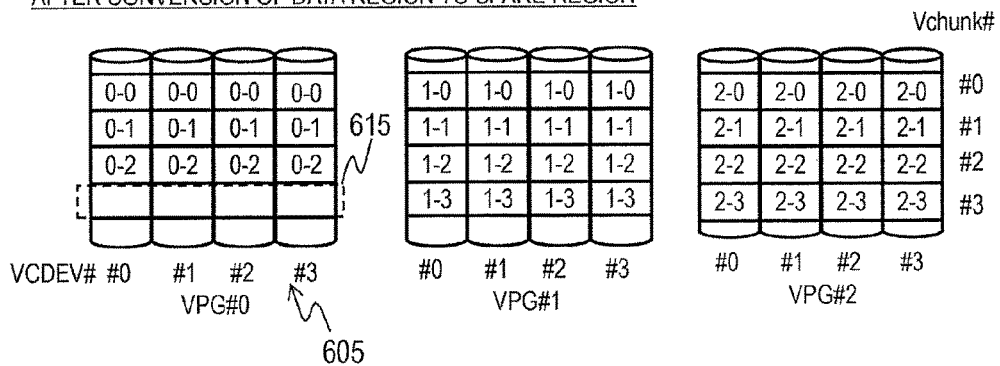
Figure 1B:
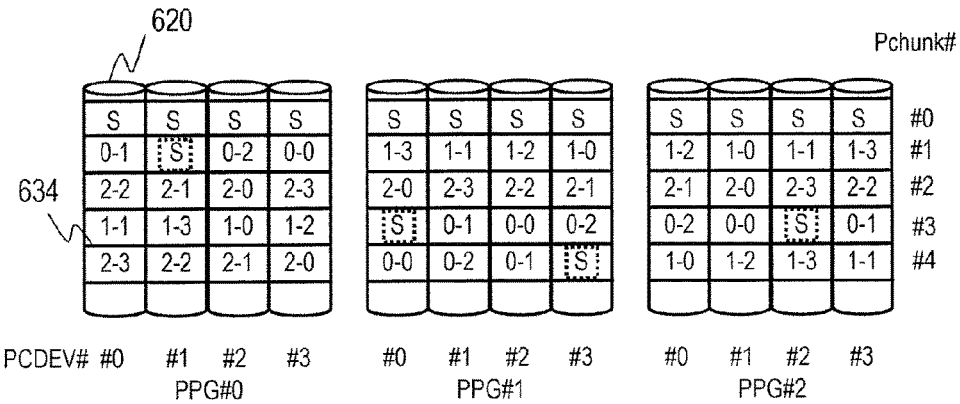
Figure 1C:
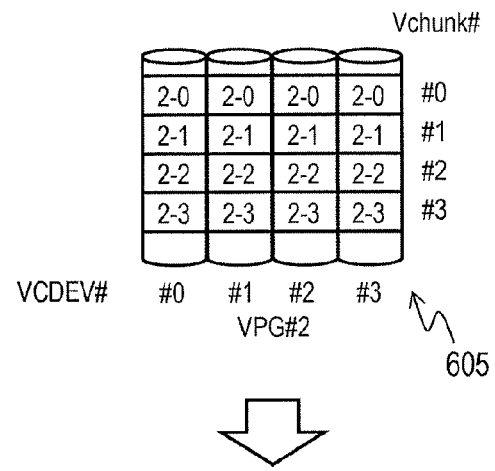
FIG. 1C shows the summary of the present disclosure.
Figure 1C:
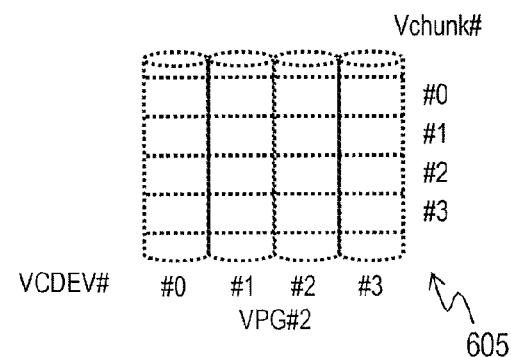

FIGS. 1B and 1C each show an example of converting the data storage regions to new spare regions of the present disclosure. In FIG. 1B, one virtual chunk 615 is selected and converted to a spare region. The virtual chunk 615, which has been converted to a spare region, is prevented from being allocated to the virtual volume. With the conversion of the virtual chunk 615 to a spare region, physical parcels 634, to which are mapped the virtual parcels 614 of the selected virtual chunk 615, are converted to spare regions.

Virtual chunks 615 that are not yet allocated to virtual volumes are selected for generation of new spare regions. By selecting the non-allocated virtual chunks 615, it becomes unnecessary to transfer data for conversion to spare regions. The conversion to spare regions of the virtual storage regions and the physical storage regions is recorded in the mapping management information.

A plurality of non-allocated virtual chunks 615 may be selected, and as an example, virtual chunks 615 having the same Vchunk# in each virtual parity group 605 are selected, or virtual chunks 615 having a Vchunk# of a prescribed period in each virtual parity group 605 are selected.

In FIG. 1C, one virtual parity group 605 is selected and converted to a spare region. All virtual chunks 615 constituting the virtual parity group 605 and the physical storage regions mapped thereto are converted to spare regions. If some virtual stripes 610 of the virtual parity group 605 are already allocated to a virtual volume, then the data of the virtual stripe 610 is migrated to a physical storage region allocated to another virtual parity group 605, thereby forming an empty region.

By converting an entire virtual parity group 605 to spare regions, it is possible to secure many spare regions in a single process. Also, the new spare regions can be managed efficiently.

[Embodiment 1]

Figure 2A:
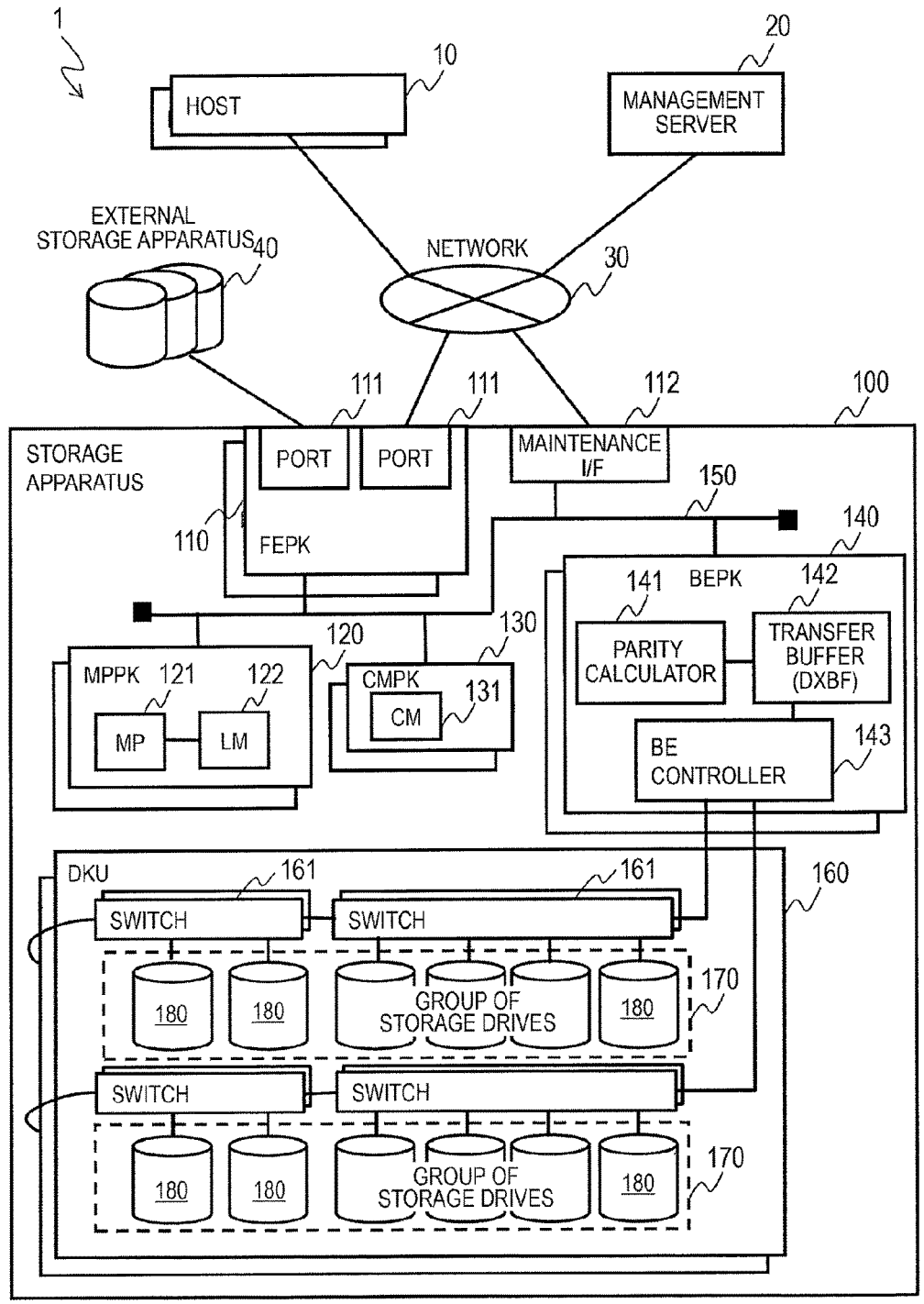
FIG. 2A shows a hardware configuration of a computer system of Embodiment 1.

A summary of a computer system including a storage system according to Embodiment 1 will be described. FIG. 2A shows a hardware configuration of a computer system 1 of Embodiment 1. The storage system is constituted of the storage apparatus 100 shown in FIG. 2A, for example. The storage system may include an external storage apparatus 40. A disk unit 160 (DKU) of the storage apparatus 100 includes a plurality of storage drives 180 (simply referred to as drives). The storage drives 180 are physical storage drives.

The storage apparatus 100 manages a capacity pool (hereinafter referred to simply as a "pool") constituted of storage regions of a plurality of storage drives 180. The storage apparatus 100 constitutes a RAID group using pool regions. In other words, a plurality of virtual parity groups (VPG) are formed using the storage drives 180, which provide the pool regions. The VPG is a virtual RAID group.

The VPG storage region is constituted of a plurality of sub-storage region arrays. Each sub-storage region array extends to a plurality of storage apparatuses (storage drives and/or external storage apparatuses) constituting the VPG, and is constituted of a plurality of sub-storage regions corresponding to the plurality of storage apparatuses. Here, one sub-storage region is referred to as a "stripe", and an array constituted of a plurality of stripes is referred to as a "stripe array". A plurality of stripe arrays constitute the storage region of the RAID group.

The RAID includes a number of levels (hereinafter, "RAID levels"). In the RAID 5, for example, data to be written as designated from a host computer corresponding to the RAID 5 is divided into pieces of data of a prescribed size (hereinafter referred to as "data units" for clarity), each data unit is divided into a plurality of data elements, and the plurality of data elements are written to the plurality of stripes.

In the RAID 5, redundant information referred to as a "parity" (hereinafter, "redundant code") is generated for each data element such that if a fault occurs in a storage drive 180, data elements that can no longer be read from that storage drive 180 can be rebuilt. The redundant code is also written to a stripe in the same stripe array.

If, for example, there are four storage drives 180 constituting the RAID group, then three data elements constituting a data unit are written to three stripes corresponding to three of the storage drives 180, and a redundant code is written to a stripe corresponding to the remaining one storage drive 180. Below, when not distinguishing the data element and the redundant code, both are sometimes referred to as stripe data elements.

In the RAID 6, two types of redundant codes (P parity and Q parity) are generated for each data unit, and the redundant codes are written to stripes of the same stripe array. In this manner, if it is not possible to read two data elements among the plurality of data elements constituting the data unit, these two data elements can be recovered.

Other RAID levels besides what was described above also exist (for example, RAID 1 to 4). Techniques for creating redundant data include triplification as well as a triple parity technique using three parities. Examples of techniques for generating redundant codes include Reed-Solomon codes using a Galois operation, even-odd, and the like. Below, RAID 5 or 6 will primarily be described, and the above method can be interchanged.

If any of the storage drives 180 undergoes a fault, the storage apparatus 100 restores the data elements stored in the failed storage drive 180. A microprocessor 121 (MP)

acquires data necessary to recover the data element stored in the failed storage drive 180 (such as other data elements and parities) from the plurality of storage drives 180 in which the data is stored.

The MP 121 stores the acquired data in the cache memory 131 (CM) through a transfer buffer 142 of an interface device (BEPK 140, for example). A parity calculator 141 of the BEPK 140 restores the data elements on the basis of data in the cache memory 131 and stores the data elements in a prescribed storage drive 180.

The computer system 1 includes one or more host computers 10 (hereinafter referred to as hosts), a management server 20, and a storage apparatus 100. The host computer 10, the management server 20, and the storage apparatus 100 are connected through a network 30. The network 30 may be a local area network (LAN), or may be a wide area network (WAN).

The storage apparatus 100 may be connected to one or more external storage apparatuses 40. The external storage apparatus 40 includes one or more storage drives. The storage drive includes a non-volatile storage medium, and includes, for example, a magnetic disk, flash memory, and other types of semiconductor memory.

The host 10 is a computer that executes applications, for example, and reads in from the storage apparatus 100 data to be used by the applications, and writes data created by the applications to the storage apparatus 100.

The management server 20 is a computer used by a manager. The management server 20 receives settings for the type of data restoration process to be executed when restoring data by an operation by the manager performed through an input device, and sets the storage apparatus 100 to perform the received data restoration process.

The storage apparatus 100 has one or more front end packages 110 (FEPK), a maintenance interface 112 (maintenance I/F), one or more microprocessor packages 120 (MPPK), one or more cache memory packages 130 (CMPK), one or more backend packages 140 (BEPK), an internal network 150, and one or more DKUs 160.

The FEPK 110, the maintenance I/F 112, the MPPK 120, the CMPK 130, and the BEPK 140 are connected through the internal network 150. The BEPK 140 is connected to the DKU 160 through a plurality of system paths.

The FEPK 110 is an example of an interface with the host 10 and has one or more ports 111. The ports 111 connect the storage apparatus 100 to various apparatuses through the network 30 or the like. The maintenance I/F 112 is an interface for connecting the storage apparatus 100 to the management server 20.

The MPPK 120 is a control unit that has an MP 121 and local memory 122 (LM). The LM 122 stores various programs and information. The MP 121 executes programs stored in the LM 122 to perform various processes. The MP 121 transmits, through the BEPK 140, various commands (READ commands, WRITE commands, etc. in the SCSI, for example) to the storage drive 180 of the DKU 160. Also, the MP 121 transmits various commands to the external storage apparatus 40 through the FEPK 110.

The CMPK 130 has the cache memory 131 (CM). The CM 131 temporarily stores write data to be written by the host 10 to the storage drive 180 or the like, and read data that has been read from the storage drive 180.

The BEPK 140 has the parity calculator 141, the transfer buffer 142 (DXBF, Data Xfer BuFfer), and a backend controller 143 (BE controller). The parity calculator 141 is a miniature processor, for example, and when a fault has occurred in the storage drive 180, the parity calculator generates a redundant code (hereinafter, a "parity") for rebuilding data elements that can no longer be read due to the fault. For data units of a RAID group constituted of RAID 5, for example, the parity calculator 141 generates P parities by taking the exclusive disjunction (XOR) of a plurality of data elements constituting each data unit.

For data units of a RAID group constituted of RAID 6, for example, the parity calculator 141 multiplies the plurality of data elements constituting each data unit by a prescribed coefficient, and then generates Q parities by taking the exclusive disjunction of the data. The parity calculator 141 performs a recovery process for recovering data elements in any of the data units on the basis of one or more stripe data elements (data elements and/or parities) of data units.

The transfer buffer 142 temporarily stores data transmitted from the storage drive 180 and data transmitted to the storage drive 180. The BE controller 143 performs communication with the storage drive 180 of the DKU 160 such as various commands, write data, and read data.

The DKU 160 has a plurality of storage drives 180. The storage drives 180 each include one or more storage media. The storage medium is, for example, a magnetic disk, flash memory, and other types of semiconductor memory (PRAM, ReRAM, etc.). Either the DKU 160 or the external storage apparatus 40 may be omitted.

The DKU 160 has a plurality of groups 170 (path groups) of a plurality storage drives 180 connected to the same bus as the BE controller 143. The storage drives 180 belonging to the same path group 170 are connected through a switch 161. The storage drives 180 belonging to the same path group 170 can directly communicate with each other.

Various data can be transmitted from one storage drive 180 to another storage drive 180 belonging to the same path group 170, for example. If for some reason a fault occurs in the switch or the power source, storage drives 180 belonging to the same path group 170 are more susceptible to being affected than storage drives 180 belonging to other path groups 170.

Figure 2B:
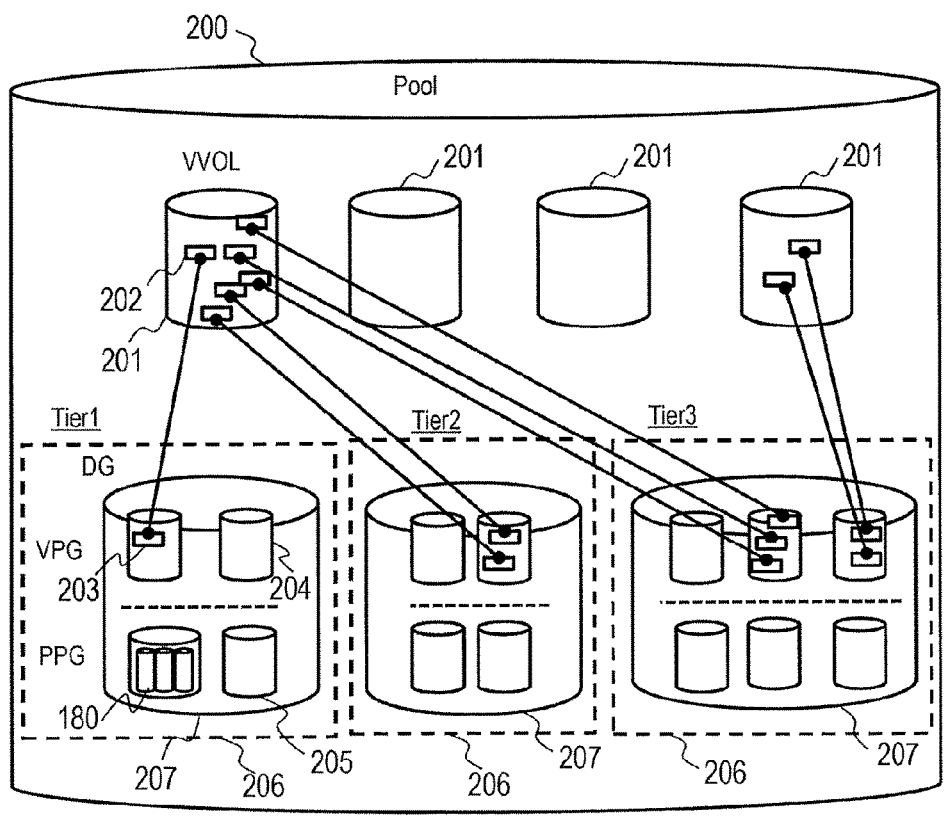
FIG. 2B shows a logic configuration of a computer system of Embodiment 1.

FIG. 2B shows a logic configuration of a computer system of Embodiment 1. The storage apparatus 100 configures a physical parity group 205 (PPG) by bundling a plurality (16, for example) of drives 180. In the present embodiment, the drives 180 in the DG 207 all have the same capacity. The PPG 205 is a unit to be increased or decreased in the distribution group 207 (DG).

The DGs 207 configure virtual parity groups 204 (VPG). The VPGs 204 are allocated to a storage region in a portion of the bundled plurality of PPGs 205. The virtual stripe arrays in the VPGs 204 are distributed to the drives of the plurality of PPGs 205 in the range of the DG 207. In other words, by I/O access to the VPGs 204, no access exceeding the range of the DG 207 to which the VPGs belong is made on the physical drives. The same number of VPGs 204 and PPGs 205 are present in the DG 207, and the identification numbers present in the DG 207 are also the same. The pool 200, which is a group of logical storage capacities, includes a plurality of VPGs 204.

As previously mentioned, the storage apparatus 100 sometimes includes, as the drives 180, a plurality of types of drives with differing performance characteristics such as flash memory drives, SAS drives, and SATA drives, for example. The drives 180 are classified into tiers 206 according to characteristic. The tiers 206 each have different performance characteristics, and thus, if the DGs 207 are constituted of drives 180 belonging to differing tiers 206, then the low performance drives form a bottleneck. Thus, the DGs 207 are configured so as to include only drives 180 that belong to the same tier 206.

A plurality of virtual volumes 201 (VVOL) are present in the pool 200. The VVOLs 201 are virtual storage devices that can be referenced by the host 10. The manager of the storage apparatus 100 creates VVOLs 201 of a desired size through the maintenance I/F 112. The size does not depend on the actual total capacity of the drives 180. The MP 121 dynamically allocates a storage region of the VPG 203 (VPG page 203) in one virtual storage region of the VVOL 201 (VVOL page 202) where there was I/O access from the host 10.

The storage apparatus 100 may record the access frequency for each VVOL page 202, and allocate a high performance VPG page 203 to the high frequency VVOL page 202. The high performance VPG page 203 belongs to the VPG 204 in the tier constituted of high performance flash memory drives in FIG. 2B, for example. The storage apparatus 100 may continuously monitor the load on the VVOL page 202 and periodically change the allocation of the VPG page 203.

Figure 3:
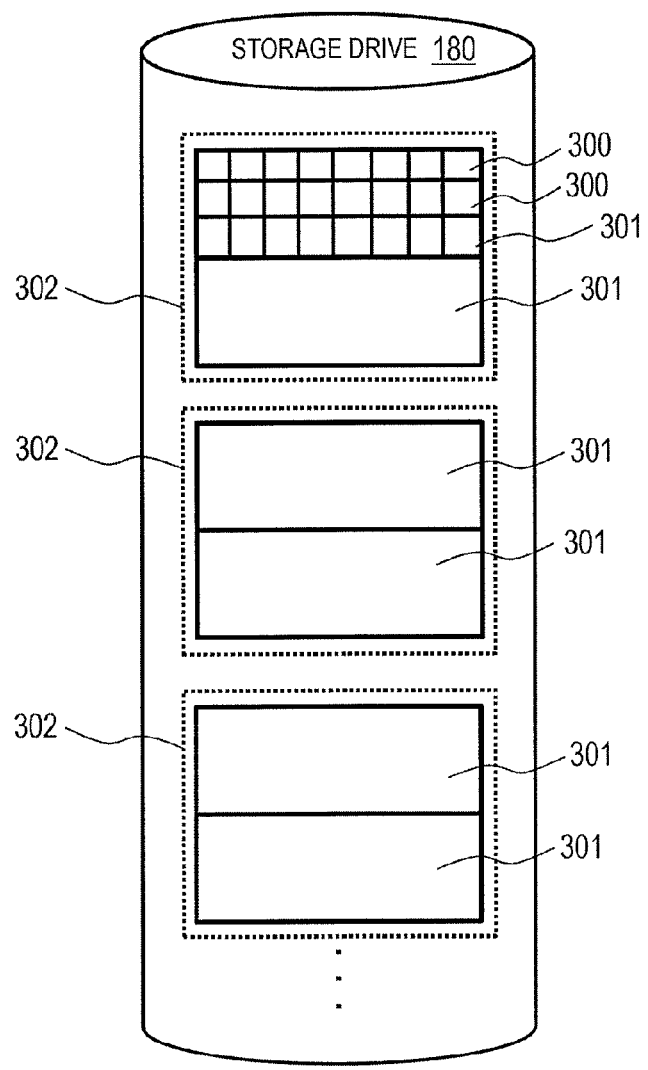
FIG. 3 shows a data configuration of a drive in the computer system of Embodiment 1.

FIG. 3 shows a data configuration of a drive in the computer system of Embodiment 1. The storage drive 180 can pass data with a higher level device, with the data having as a unit a sub-block 300, which is the minimum unit for SCSI command processing (512 bytes, for example). A slot 301 is a management unit for when data is being cached on the cache memory 131, and is 256 kB, for example. The slot 301 is constituted of a group including a plurality of consecutive sub-blocks 300. The stripe 302 stores a plurality of slots 301.

Figure 4:
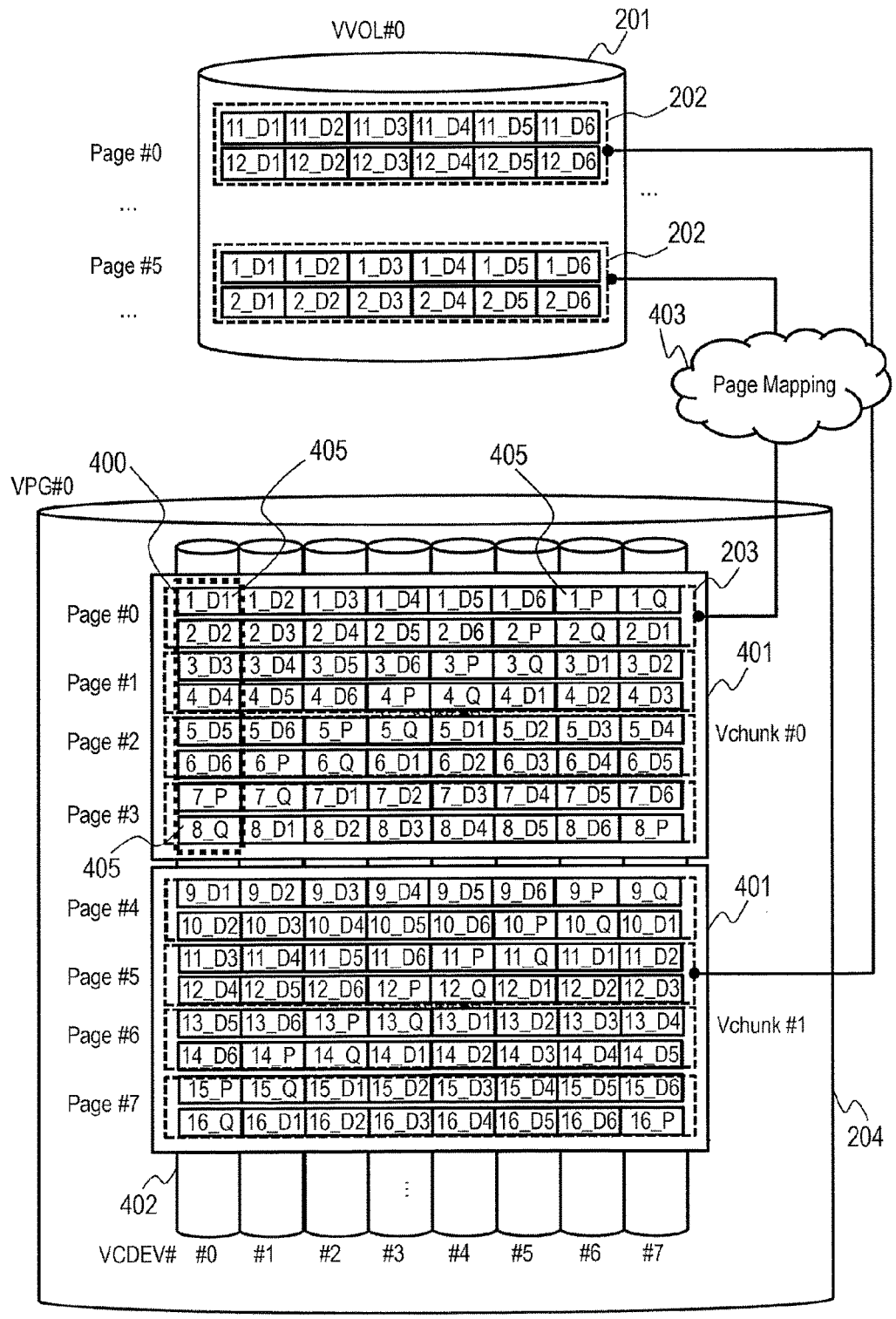
FIG. 4 shows a data mapping structure of the computer system of Embodiment 1.

FIG. 4 shows a data mapping structure of the computer system of Embodiment 1. The VVOL 201, which is recognizable by the host 10, is constituted of a plurality of VVOL pages 202. The VVOL 201 has a unique identifier (VVOL number) in the storage apparatus 100. The VVOL page 202 has allocated thereto a VPG page 203 on the VPG 204. This relationship is referred to as a page mapping 403. Relationships in a page mapping table 805 to be described later are dynamically managed by the MP 121.

In the VPG 204, one or more virtual chunks 401 (Vchunks) are managed. The Vchunk 401 is constituted of a plurality of parcels 400. In the example of FIG. 4, the Vchunk 401 is constituted of eight parcels 400.

The parcels 400 are constituted of consecutive regions in one virtual storage drive 402. The parcels 400 are each constituted of one or more stripes, and in the example of FIG. 4, are constituted of eight stripes 405. There is no special limitation on the number of stripes 405 in the parcel 400. As a result of the parcel 400 being constituted of a plurality of stripes 405, the process can be made more efficient.

As shown in FIG. 4, the Vchunk 401 is constituted of parcels 400 of eight different storage drives 180, for example, if a 6D+2P configuration is adopted for the RAID 6, that is, a configuration in which six data elements (D) constituting a data unit and two parities (P) corresponding to these data elements are stored in differing storage devices, respectively.

In other words, in FIG. 4, the Vchunk 401 is constituted of a plurality of stripe arrays, and specifically, eight stripe arrays. As a result of the Vchunk 401 being constituted of a plurality of stripe arrays, the process can be made more efficient. The Vchunk 401 may be constituted of one stripe array.

The Vchunk 401 includes a plurality (four, for example) of VPG pages 203. The VPG page 203 can store data elements and parities of a plurality (two, for example) of consecutive data units (data of same stripe array). By setting the plurality of data units to be a few MB, for example, the sequentiality of the host I/O can be kept constant even if the drives 180 are magnetic disk.

In FIG. 4, reference characters such as 1_D1, 1_D2, 1_D3, 1_D4, 1_D5, 1-D6, 1_P, and 1_Q where the number before the "_" is the same indicate data elements and parities in the same data unit (stripe array). The data elements and parities are, respectively, the size of the stripe 302.

The VPG 204 has a unique identifier (VPG number) in the storage system. Also, each VPG 204 is given a drive number (VCDEV number) representing a given number (hereinafter expressed as "N") of virtual drives 402. This is an identifier for arranging the storage regions in the VPG 204, and represents the relationship between the drives (PCDEV) in the PPG 205 to be described later.

Each VVOL 201 is accessed from the host 10 using the identifier and LBA indicating the VVOL 201. As shown in FIG. 4, the VVOL Page# is assigned from the head of the VVOL 201. The page# can be calculated for the LBA designated by the host I/O by the following formula. Here, Floor (x) is a symbol indicating the maximum integer of x or less for a real number x.

VVOL Page#=Floor(LBA/VVOLPageSize(sub-block number))

The VVOL page 202 and VPG page 203 are constituted of a plurality of stripes. However, the host 10 is prevented from accessing parity data, and thus, the parity is not seen in the VVOL 201. In the case of the 6D+2P configuration shown in FIG. 4, for example, the 8×2 stripes (VVOL pages 202) in the space of the VPG 204 are seen as 6×2 stripes (VVOL pages 203, VVOL page size) in the VVOL 201.

By correcting this, it is possible to calculate the VCDEV# and Vchunk# in the VPG# corresponding to the VVOL 201 side LBA, and the offset address in the parcel 400 by matching the page mapping 401. It is naturally possible to also calculate the VCDEV# and Vchunk# in the VPG# of the parity region corresponding to the host I/O and the offset address in the parcel 400.

FIG. 4 shows the case of a RAID 6 (6D+2P), but the D number may be increased to provide a configuration of 14D+2P or the RAID may create parity-only parcels as in RAID 4, for example. Also, the encoding method for the Q parity may be another generally known method such as the even-odd method instead of the Galois operation.

Figure 5:
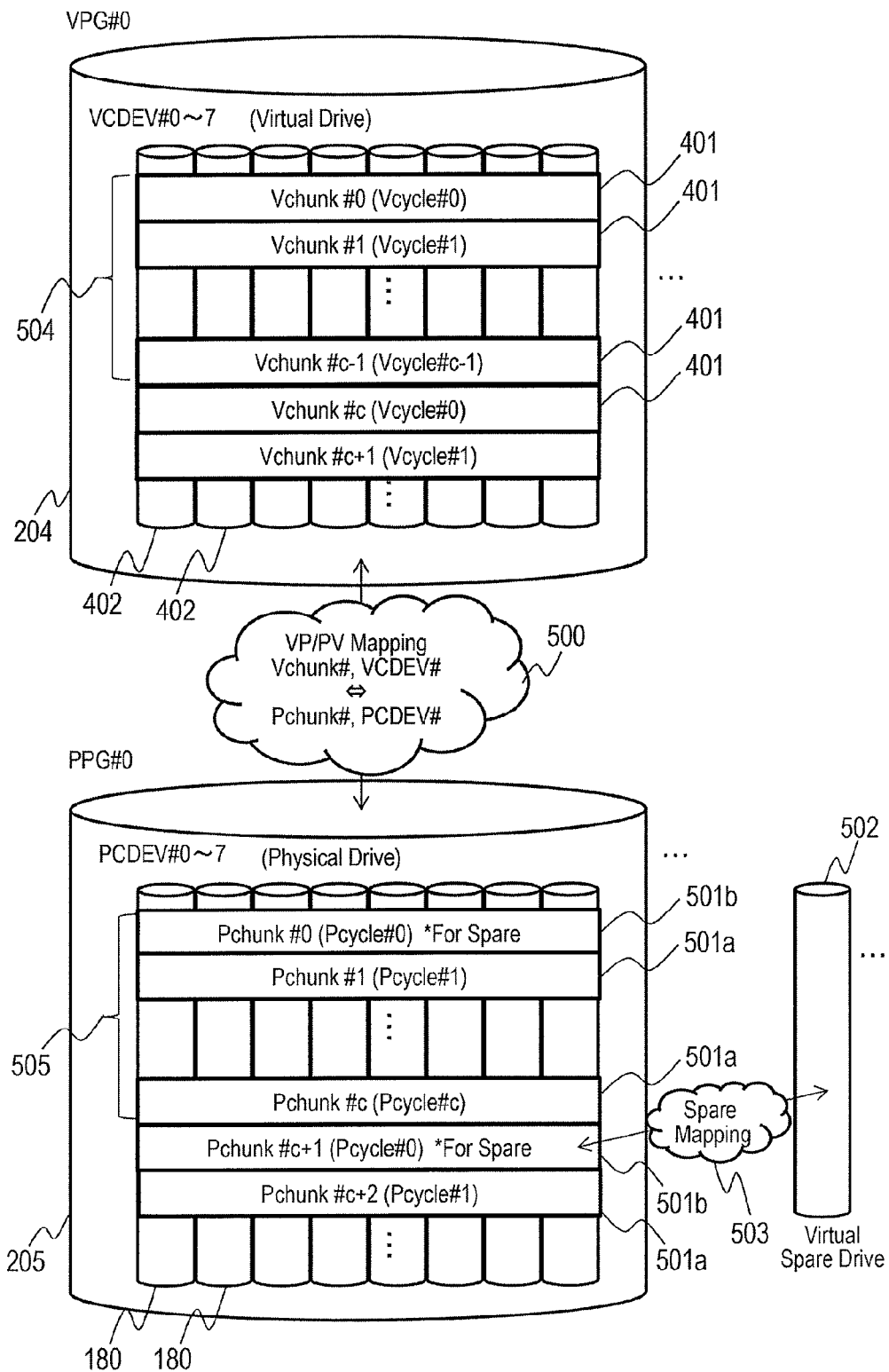
FIG. 5 shows a data mapping configuration of a VPG and PPG in the computer system of Embodiment 1.

FIG. 5 shows a data mapping configuration of the VPG 204 and the PPG 205 in the computer system of Embodiment 1. The Vchunks 401 are, as also shown in FIG. 4, consecutive in the space of the storage region of the VPG 204. A "c" number of consecutive Vchunks 401 constitute a Vchunk period 504. One Pchunk 501b and a "c" number of Pchunks 501a that are consecutive constitute a Pchunk period 505. The Pchunk 501b is a spare region, and the Pchunk 501a is a data region.

The Vchunk periods 504 correspond, respectively, to the Pchunk periods 505. The mapping of the Vchunk to the Pchunk is periodic, and the mapping is shared between the pair of virtual chunk period 504 and Pchunk period 505. By the mapping between the virtual storage region and the physical storage region being periodic, it is possible to appropriately distribute data in the physical region and to manage the mapping efficiently. Aperiodic mapping may alternatively be adopted.

The identifiers for the Vchunks 401 in each virtual chunk period 504 are represented by a Vcycle#. Therefore, the Vcycle# takes a value from 0 to c−1. The identifiers for the Pchunks 501 in each Pchunk period 505 are represented by a Pcycle#. The Pcycle# takes a value from 0 to c.

VP/PV mapping management information 500 manages the relationship between the Vchunks 401 and the Pchunks 501a. Pchunks 501a belonging to a plurality of PPGs 205 are allocated to each virtual chunk period 504.

Meanwhile, Vchunks 401 belonging to a plurality of VPGs 204 are allocated to each Pchunk period 505. The actual parcel data in the Vchunk 401 is allocated in a lateral fashion to the Pchunks 501a.

As described above, the Pchunk period 505 has a spare Pchunk 501b, and thus, the number of chunks thereof is one greater than the number of chunks in the Vchunk period 504. Where a formula Pchunk# mod (c+1)=0 applies, that is, where Pchunk#=k (c+1) (k being an integer of 0 or greater), the Pchunk 501b with that Pchunk# is the spare region. The spare region is a reserved region to be used for recovery in the rebuilding process if a drive in the DG 207 belonging to the PPG 205 undergoes a fault.

A virtual spare drive 502 corresponds to the failed drive, and is a drive that does not physically exist. As a region, a portion of the spare Pchunk 501b is allocated. Spare mapping management information 503 manages this allocation. The mapping method will be described later.

Figure 6:
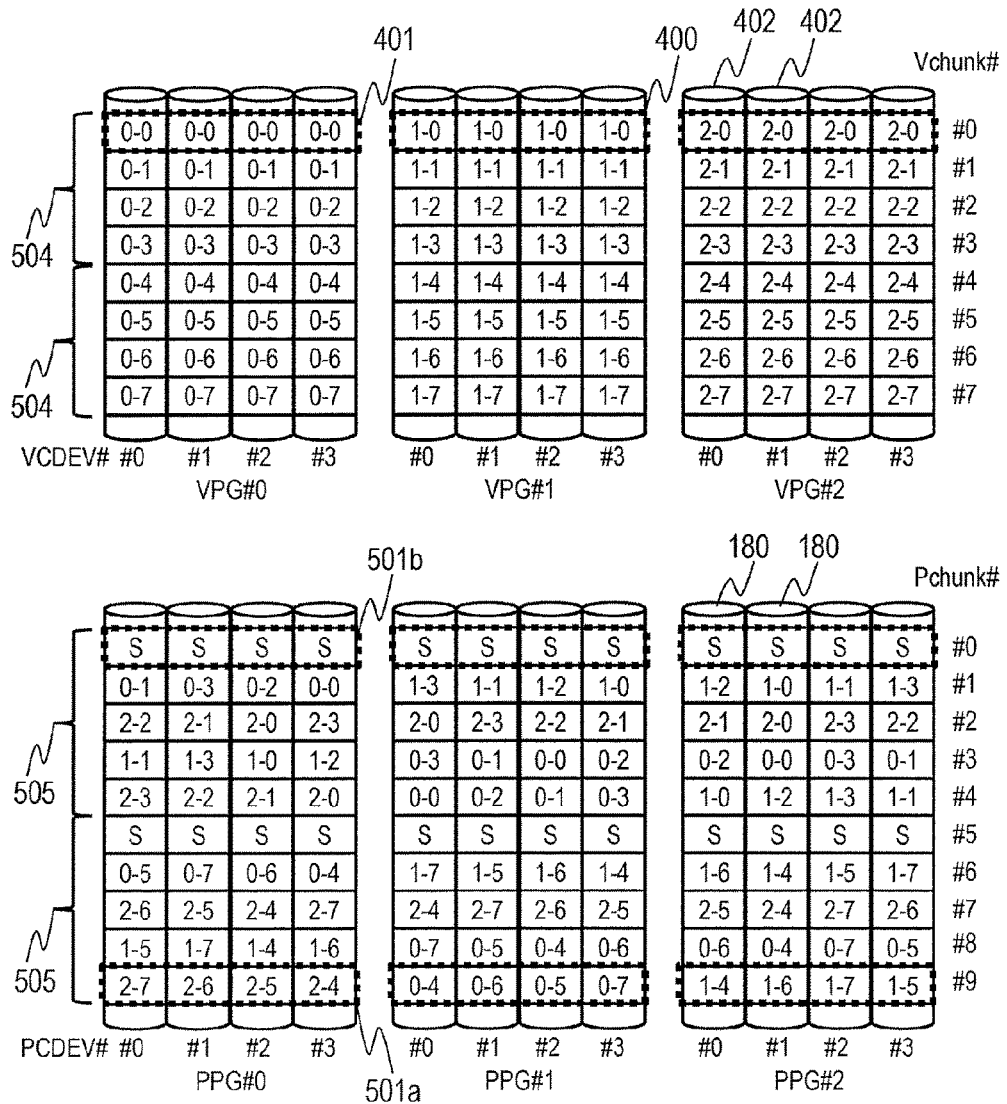
FIG. 6 shows an example of data mapping between VPGs and PPGs.
Figure 7:
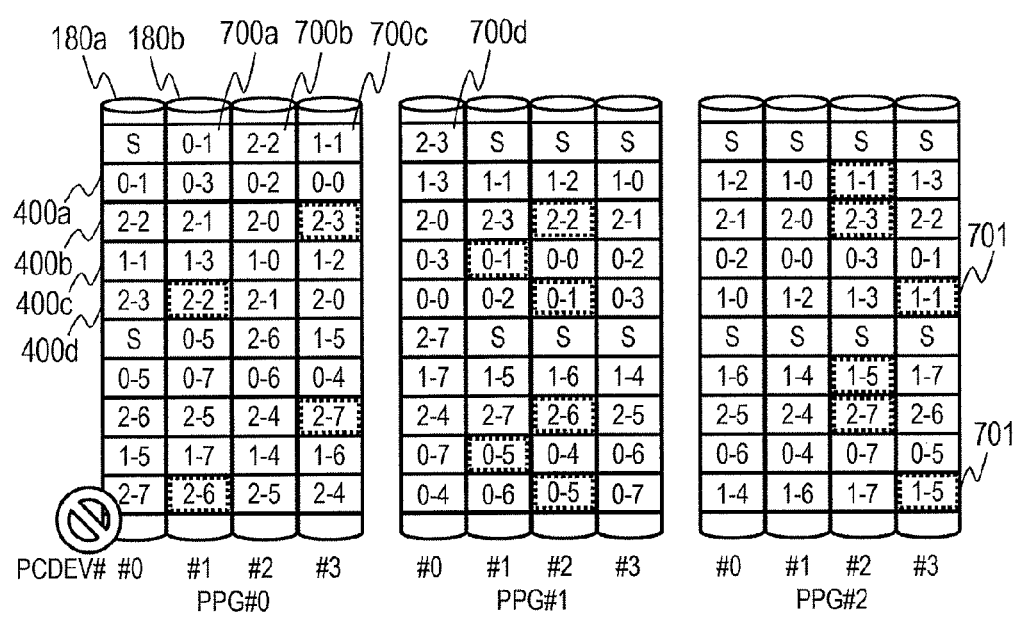
FIG. 7 shows a rebuilding operation example of the computer system of Embodiment 1

FIGS. 6 and 7 show an example of data mapping between the VPGs 204 and the PPGs 205. In FIGS. 6 and 7, an example is shown in which c=4, N=4, and PG=3. "c" is the number of Vchunks in the Vchunk period 504, N is the number of drives in the parity group, and PG is the number of parity groups in the DG. Below, effects of the method to be disclosed in the present embodiment will be described with reference to these drawings.

The "x" in the identifier "x-y" indicated in the parcel 400 in the VPG 204 represents the VPG#. "y" represents the Vchunk#. The position in the physical storage region corresponding to the parcel is indicated in the same identifier in the rectangle (parcel) in the PPG 205. Each drive in the PPG 205 has defined therefor a spare region 501b (indicated as "S").

In FIG. 6, in each PPG 205, the Pchunk period 505 (c+1=5 Pchunks) mapping pattern is the same. FIG. 7 shows a rebuilding operation example (when one drive is failed). Here, a rebuilding operation is shown for when the drive 180a is failed, that is, the PCDEV#0 of a PPG#0 is failed.

First, a parcel including the failed drive (the parcel 400a, for example) is disposed in the spare region (700a, for example) (updating of management table). The rebuilding process is performed on the allocated spare region 700. In 2D+2P, there are three operational parcels belonging to the same stripe as each parcel 400 in the failed drive. If two of these parcels are read from the operational drive 180b, it is possible to recover lost data from the failed drive.

Thus, by selecting two operation drives 180b from among three operational drives 180b in which each parcel 400 is present such that no one drive among all the operational drives 180b is disproportionately selected, it is possible to restrict the maximum read amount from the drive 180b per period to the equivalent of two parcels. In other words, compared to the conventional RAID method, it is possible to double the rebuilding performance. In the example of FIG. 7, in order to recover the data of the failed drive 180a, the parcels 701 surrounded by the dotted lines are read from the operational drives 180b.

In the example in this drawing, a case was described in which c=4, but in general, by setting the value of c to less than or equal to the PG number to the Pth power, it is possible to increase the probability that the number of parcels per period is one or less when data loss occurs. Also, in general, by setting the c value to the PG number to the P−1th power or less, it is possible to reduce the probability of data loss resulting from simultaneous failures that go beyond the scope of redundancy.

However, if c is set too low, the effect of reducing the rebuilding time is diminished. When c=1 the data loss rate is equivalent to that of a conventional RAID method, and the greater c is, the lower the data loss rate is. On the other hand, if c is set too high, as the stripe distribution range broadens, the internal transfer process becomes a performance bottleneck due to reasons such as performance limits of the BE controller 143, the switch 161, the band of the CMPK 131, and the parity calculator 141, which reduces reliability.

In other words, in order to simultaneously attain advantageous properties for the three characteristics (durability against simultaneous failure of multiple drives, reduction in rebuilding time, localization of loss range), it is preferable that the value of c be set to approximately PG to the P−1th power so as not to exceed the bottleneck during the transfer process.

Figure 8:
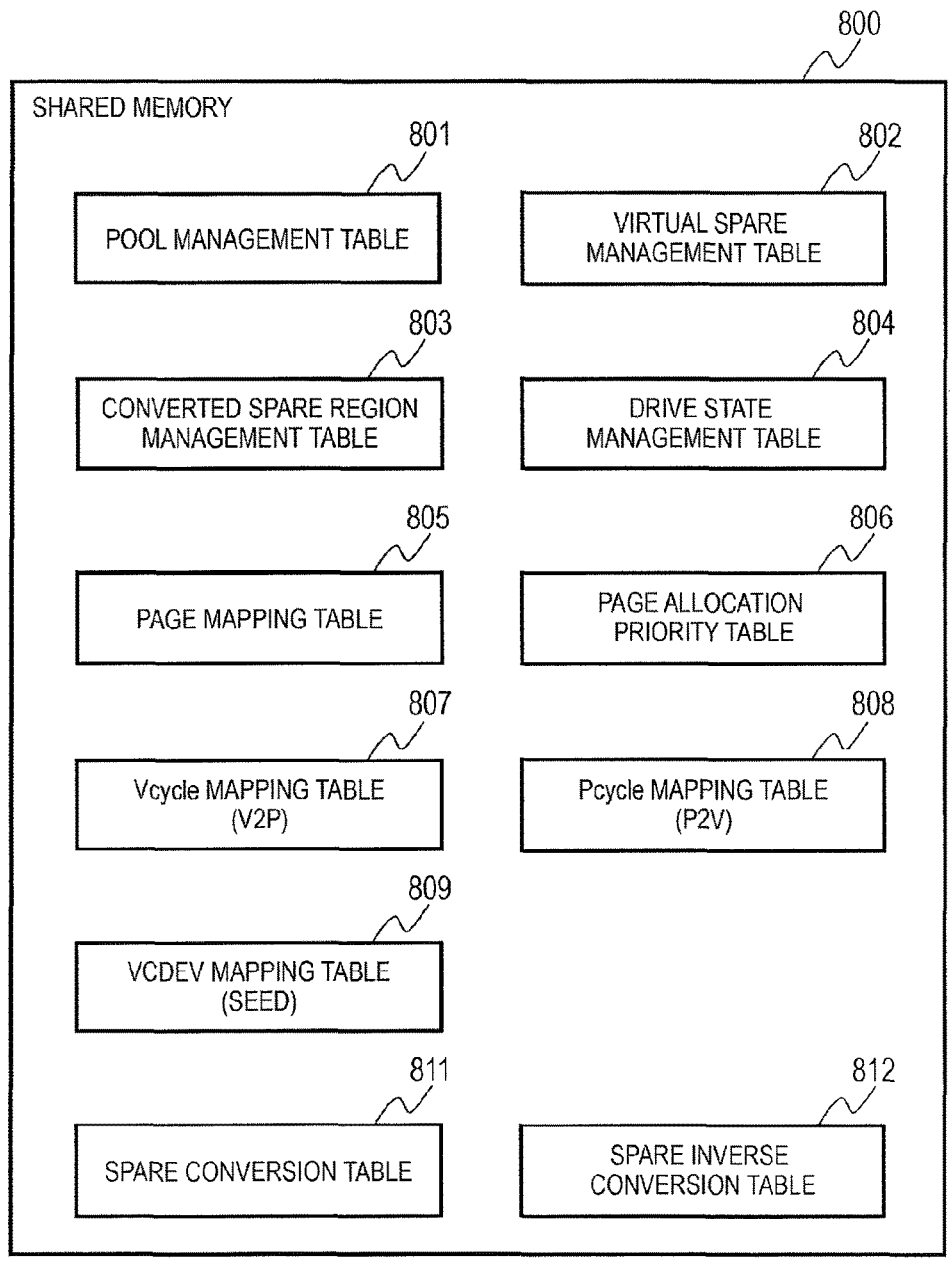
FIG. 8 shows a table in a shared memory according to Embodiment 1.

FIG. 8 shows a table in a shared memory 800 according to Embodiment 1. The shared memory 800 is constituted of the storage region of at least one of the following: the storage drive 180; the CM 131; and the LM 122, for example. A logical shared memory 800 may be configured using storage regions of a plurality of configurations in the storage drive 180, the CM 131, and the LM 122, with cache management being performed for various types of information.

The shared memory 800 stores a pool management table 801, a virtual spare management table 802, a converted spare region management table 803, a drive state management table 804, a page mapping table 805, a page allocation priority table 806, a Vcycle mapping table 807 (V2P table), a Pcycle mapping table 808 (P2V table), a VCDEV mapping table 809 (SEED table), a spare conversion table 811, and a spare inverse conversion table 812.

The Vcycle mapping table 807 manages the mapping of Vchunks and Pchunks, and manages the mapping of each chunk for each period. The Vchunk is identified by the VPG# and Vcycle#, and the corresponding Pchunk is identified by the PPG# and Pcycle#. The mapping is shared between each pair of Vchunk period and Pchunk period. The Vcycle mapping table 807 enables identification of physical chunks allocated from the Vchunk. The Pcycle mapping table 808 is a inverse lookup table for the Vcycle mapping table 807.

The VCDEV mapping table 809 manages information to be the source for calculating the relationship between each VCDEV in the Vchunk and the data arrangement of each PCDEV. The VCDEV mapping table 809 stores the VPG# and VCDEV# in each index column, and stores the SEED value corresponding to the VPG and VCDEV in the value column. The SEED value is an integer from 0 to c−1. The SEED value is uniquely determined during initialization. Other tables in FIG. 8 will be described in detail below.

Figure 9:
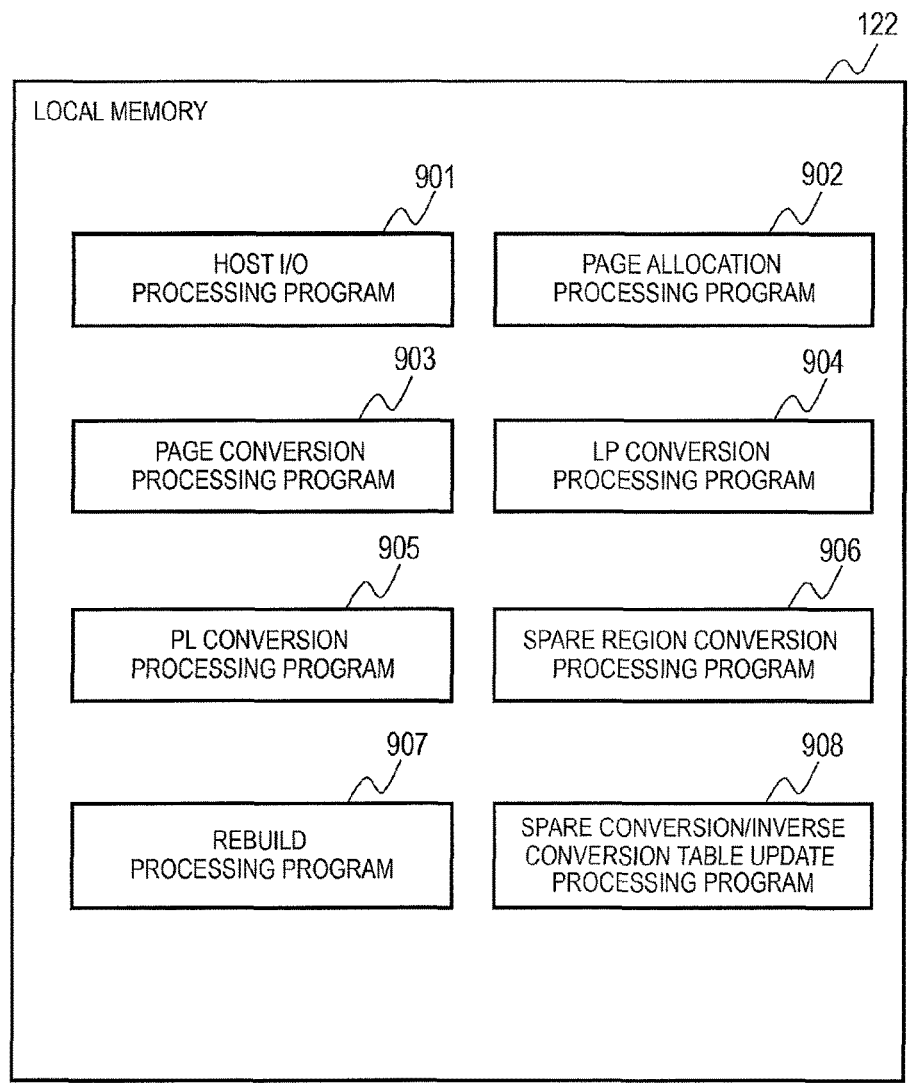
FIG. 9 shows the configuration of the local memory according to Embodiment 1.

FIG. 9 shows the configuration of the local memory 122 according to Embodiment 1. The local memory 122 stores a host I/O processing program 901 that executes a read/write process, a page allocation processing program 902, a page conversion processing program 903, an LP conversion processing program 904, and a PL conversion processing program 905. The local memory 122 additional stores a spare region conversion processing program 906, a rebuild processing program 907, and a spare conversion/inverse conversion table update processing program 908.

FIGS. 10A and 10B show the pool management table 801 and the virtual spare management table 802, respectively. The pool management table 801 shows the relationship between the pool 200, the tier 206, the DG 207, and the VPG 204. The pool management table 801 includes the following fields: the pool# 1000, the tier# 1001, the DG# 1002, and the VPG # 1003.

With this table, the MP 121 can look up the identifiers of the DGs 207 belonging to each tier 206 in the pool 200, and the identifier of the VPGs 204 belonging to each DG 207. The number of VPGs 204 and PPGs 205 and the numbering thereof in the DGs 207 are the same, and thus, it is possible to know the PPG# belonging to each DG 207. If VPG#s 0, 1, and 3 belong in a given DG 207, for example, it can also be seen that PPG#s 0, 1, and 3 belong in the DG 207.

The virtual spare management table 802 manages the virtual spare drive belonging to the DG 207 and the state thereof. The virtual spare management table 802 includes the following fields: a DG# 1004; a virtual spare drive# 1005 (VSD#); a PPG# 1006; a PCDEV# 1007; a state 1008; and a copy pointer 1009.

The DG 207 is provided with a spare region according to the scale thereof. The spare region is managed as a virtual spare drive. According to the size of the spare region of the DG 207, the MP 121 generates the virtual spare drive as an entry in the table. This is initiated when increasing/decreasing the size of the PPG 205 in the DG 207 or when initializing the storage apparatus 100, for example. The PPG# 1006 and the PCDEV# 1007 are identifiers of the failed physical storage drive 180 corresponding to the VSD# 1005. If the virtual spare drive is unused, then an invalid value (hereinafter called "not-a-number (NaN)" is inputted.

The state 1008 represents the usage state of the spare drive. When the physical storage drive 180 is closed, the table is referenced in order to find an unused virtual spare drive. If the virtual spare drive is in use, then "in use" is stored and if not in use, "unused" is stored.

The copy pointer 1009 stores pointer information indicating to which LBA rebuilding has progressed if rebuilding is being performed on the virtual spare drive corresponding to the value of the virtual spare drive# 1005 of the entry. If not in the process of rebuilding, NaN is stored. Also, in an initial state during rebuilding, the value is 0, and in the final state during rebuilding (after the rebuilding process has been completed), the maximum LBA of the physical storage drive 180 being recovered is stored.

FIGS. 11A and 11B show the converted spare region management table 803a and the drive state management table 804, respectively. The converted spare region management table 803a is used in Embodiments 1 and 2 under the same name but different formats, respectively, and where distinction therebetween is necessary, the distinction is made by the reference characters "803a" and "803b".

The converted spare region management table 803a manages regions in use and regions secured as new spare regions in the VPGs 204 belonging to the DG 207. The converted spare region management table 803a includes a DG# 1100, an in-use Vcycle# 1101, and a spare Vcycle# 1102.

The DG# 1100 stores the DG#. The in-use Vcycle# 1100 stores the largest value among the Vcycle#s that already use one or more VPG pages 203 in the VPGs 204 in the DG 207. As will be described later, in each VPG, the VPG pages are allocated in order from the smallest Vcycle# (enter a state of being in use).

If the DG 207 is constituted of the VPG# 0 and the VPG# 1, and VPG# 0 is in use until Vcycle# 3 and VPG# 1 is in use until Vcycle# 5, then the in-use Vcycle# 1101 corresponding to the DG# stores 5.

Therefore, in the DG 207, a Vcycle# greater than the in-use Vcycle# 1101 is never allocated to the VPG page 203. If the VPG pages 203 are not used at all in the DG 207, then a NaN is stored.

The spare Vcycle# 1102 stores the Vcycle# secured as a new spare region. As will be described later, in each VPG, the Vchunks are converted to spare regions in order from the largest Vcycle#. Therefore, in the VPG 204, Vcycle# s greater than or equal to the spare Vcycle# 1102 are secured as spare regions and new allocation of the VPG pages 203 cannot be made. If spare region conversion is not being performed in the DG#, NaN is stored.

In each VPG, Vchunks may be allocated to the VVOL in order from the largest Vcycle#, and the Vchunks may be converted to spare regions in order from the smallest. Vcycle#. A Vchunk allocated from one end of the Vchunk period 504 is selected, and a Vchunk converted to a spare region is selected from the other end, thereby realizing efficient management of spare regions and open regions. The Vchunk converted to a spare region may be selected from among appropriate open Vcycle# s. In the period mapping, the Vcycle# selected for conversion to a spare region in the Vchunk period 504 of each VPG is the same.

As shown in FIG. 11B, the drive state management table 804 manages the states of the physical storage drives 180 constituting the PPG 205. The drive state management table 804 includes a PPG# 1103, a PCDEV# 1104, a state 1105, and a field. The PPG# 1103 stores the PPG#. The PCDEV# 1104 stores the number of the physical storage drive 180 constituting the PPG 205 of the PPG# 1103.

The state 1105 stores the state of the physical storage drive 180 corresponding to the PPG# 1103 and the PCDEV# 1104. States of the physical storage drive 180 include "normal", indicating that read and write access is possible in the physical storage drive 180 and that the physical storage drive is in normal operation, and "inaccessible" indicating that due to a fault or a like, the read or write access in physical storage drive 180 is impossible.

FIGS. 12A and 12B show a table pertaining to page mapping of the computer system of Embodiment 1. FIG. 12A shows the page mapping table 805. The page mapping table 805 shows the relationship between the VVOL 201 page and the VPG 204 page. The page mapping table 805 includes the fields of a pool# 1200, a VVOL# 1201, and a VVOL page# 1202, and a VPG# 1203, a Vcycle# 1204, and a VPG page# 1205 corresponding, respectively, thereto. In a VPG# 1203 and VPG page# 1204 corresponding to a VVOL page# 1202 that is not in use have stored therein a value corresponding to "Not Allocated".

FIG. 12B shows the page allocation priority table 806. The page allocation priority table 806 shows the priority level (degree of priority) for determining from which VPG 204 the page allocated to the VVOL 201 should be used. The page allocation priority table 806 has the fields of a VVOL# 1205, a priority level 1206, and a VPG# 1207.

The VVOL# 1205 stores the VVOL#. The priority level 1206 has a higher priority level, the smaller the value is, and the VVOL# 1 is provided with pages from the VPG# 2 at the highest priority. If there are no more empty pages in the VPG# 2, then pages are provided from the VPG# 0, which has the next highest priority level. In this manner, the VVOL pages are allocated with priority to specific VPGs, and thus, it is possible to restrict the impact of data loss due to a fault or the like in a drive 180 to the minimum number of VVOLs possible.

FIGS. 13A and 13B show a table indicating the mapping between the spare origin and spare destination for spare conversion in the computer system of Embodiment 1. FIG. 13A shows the spare conversion table 811. The spare conversion table 811 indicates whether, in a failed drive 180 in a PPG 205, any of the parcels of the virtual spare drive 502 provided virtually as a storage region as the recovery origin have been mapped to any of the spare destination physical parcels.

The spare conversion table 811 has a VSD# 1300 and a Pcycle# 1301 as keys, and a PPG# 1302, a PCDEV# 1303, and a Pcycle# 1304 as corresponding spare destination parcel information. The VSD# 1300 field has stored therein all VSD#s defined in advance. A NaN is stored in the PPG# 1302, the PCDEV# 1303, and the Pcycle# 1304 corresponding to unused VSD#s 1300.

FIG. 13B shows the spare inverse conversion table 812. The spare inverse conversion table 812 is an inverse lookup table for the spare conversion table 811. The keys and entries thereof are the opposite to those of the spare conversion table 811.

The spare inverse conversion table 812 has a PPG# 1305, a PCDEV# 1306, and a Pcycle# 1307 as spare destination parcel information and uses these as keys. The spare inverse conversion table 812 has a VSD# 1308 and a Pcycle# 1309 as corresponding spare destination parcel information.

The spare inverse conversion table 812 stores information of a parcel defined as a spare region. The VSD# 1308 and the Pcycle# 1309 corresponding to a parcel not used as a spare region have stored therein a NaN. As described above, the spare conversion table 811 and the spare inverse conversion table 812 enable appropriate management of mapping between the spare origin and spare destination.

Figure 14:
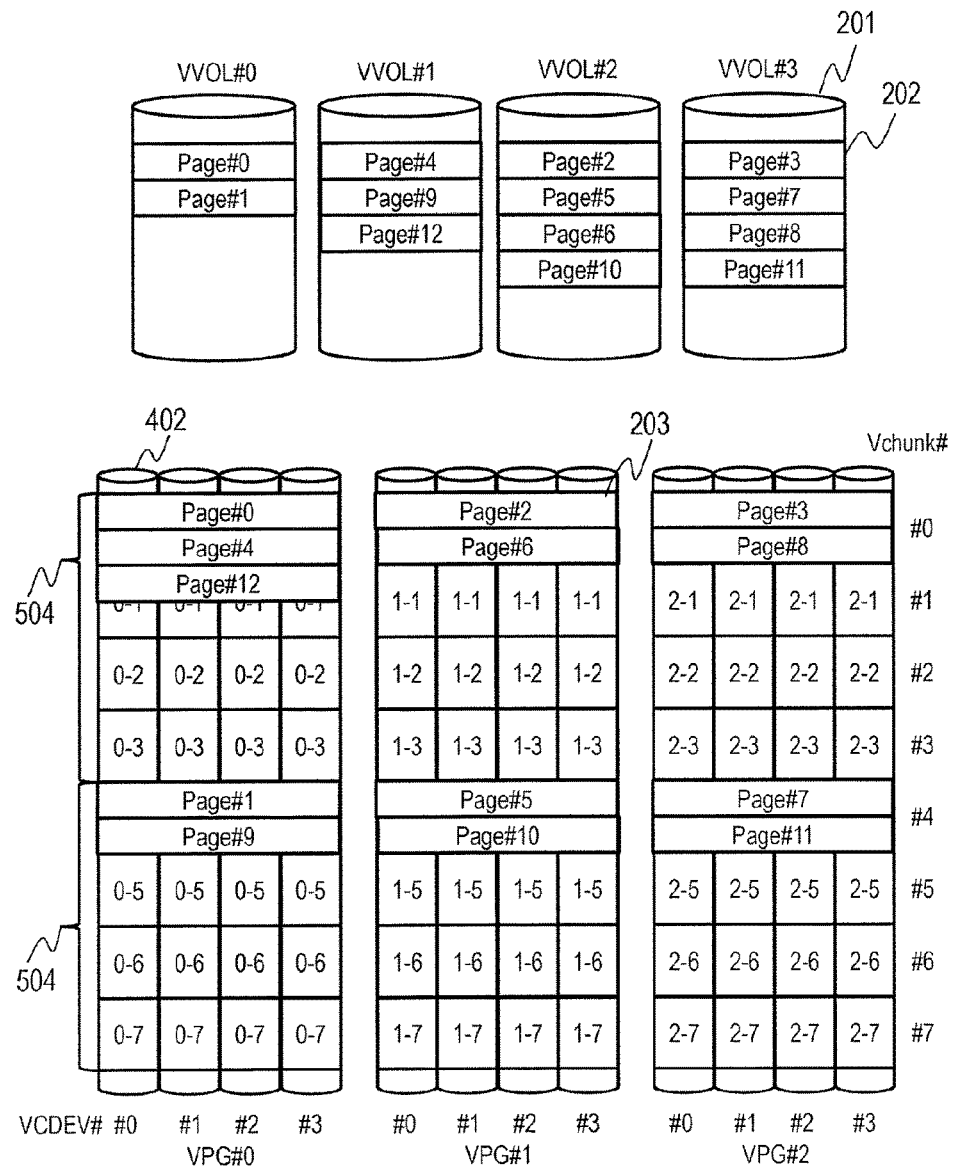
FIG. 14 shows the concept of a page allocation process of the computer system of Embodiment 1.

FIG. 14 shows the concept of a page allocation process of a computer system of Embodiment 1. In FIG. 14, an example is shown in which the VVOL number=4, c=4, N=4, and PG=3. The VVOL page 202 in the VVOL 201 has allocated thereto a VPG page 203 of the VPG 204. An empty region of the Vchunk 401 with the smallest Vcycle# within one VPG 204 is used with priority for the VPG page 203. During a Vchunk period 504 of one VPG 204, the difference in number of allocated Vchunks is 1 or less. The difference in number of allocated Vchunks in differing VPGs 204 may be 2 or less.

FIG. 15 shows the page allocation process of the computer system of Embodiment 1. The page allocation processing program 902 executes a page allocation process. The page allocation process of FIG. 15 is executed as a part of the writing process from the host 10 if the page to be written is not allocated.

The determination of whether or not the page has been allocated is determined on the basis of the page mapping table 805. If the page is not allocated, then the VPG# 1203 field of the page mapping table 805 has stored therein information such as "Not Allocated", and thus, the page allocation processing program 902 can determine whether the page has not been allocated. In the initial state of the system (state in which the host I/O has not been executed at all on the virtual volume 201), all of the fields have "Not Allocated" stored therein.

First the page allocation processing program 902 acquires the DG# to be allocated (step 1501). In the method for selecting the DG 207, it is determined whether there is an empty page in order to highest tier of the pool 200, for example, and for tiers 206 where there is an empty page, the DG 207 with the lowest usage rate of pages is selected, or the DG 207 with the lowest I/O load per unit time is selected.

After selecting the DG 207, the page allocation processing program 902 acquires the highest priority VPG# for the virtual volume 201 (step 1502). The page allocation processing program 902 refers to the page allocation priority table 806 and finds the VPG# 1208 with the lowest value for the priority level 1206.

Next, the page allocation processing program 902 determines whether the acquired VPG# is mounted in the DG 207 acquired in step 1501, with reference to the pool management table 801 (step 1503).

If the VPG# is not mounted in the DG 207 (step 1503: NO), the page allocation processing program 902 refers to the page allocation priority table 806, selects the VPG# with the next highest priority level, and performs the determination of step 1503 again.

If the VPG# is mounted in the DG 207 (step 1503: YES), then the page allocation processing program 902 determines whether an empty page is present in the VPG# (step 1504). The page allocation processing program 902 refers to the page mapping table 805 and determines whether unallocated VPG pages 1204 are present in the VPG#.

If no empty page is present (step 1504: NO), the page allocation processing program 902 then selects the VPG# with the next highest priority level, and performs the determination of steps 1503 and 1504 again. If an empty page is present (step 1504: YES), then the page allocation processing program 902 performs the in-VPG allocation destination selection process (step 1505). The in-VPG allocation destination selection process will be described later.

If the allocation destination could be selected (step 1506: YES), then the page allocation processing program 902 updates the in-use cycle information (step 1507). The in-use cycle information updating process will be described later. Then, in order to allocate pages to the selection region, the page allocation processing program 902 updates the page mapping table with allocation destination information (step 1508) and terminates the process.

If an allocation destination could not be selected (step 1506: NO), the page allocation processing program 902 issues a response to the requester for the process that allocation was not possible (step 1509) and terminates the process. In this manner, it is possible to allocate pages starting with the VPG 204 with the highest priority level possible on the basis of the degrees of priority of each virtual volume 201.

In the page allocation priority table 806, the priority level for each VVOL 201 may be a random value (VPG#) with a predetermined appearance of one at a time. The manager may set the priority level of the VPG# for each VVOL 201 or group of VVOLs 201 through the management server 20 and the maintenance I/F 112.

If using the copying function for the VVOL 201, then from the perspective of data protection, the priority level may be determined automatically on the storage side or the management I/F side such that differing VPG#s are prioritized for the pairs of VVOLs 201. In such a case, it is possible to increase the probability of being able to recover data from a copy of the VVOL 201 for the VVOL 201 where data was lost if a drive fault occurs and data is lost.

Figure 16:
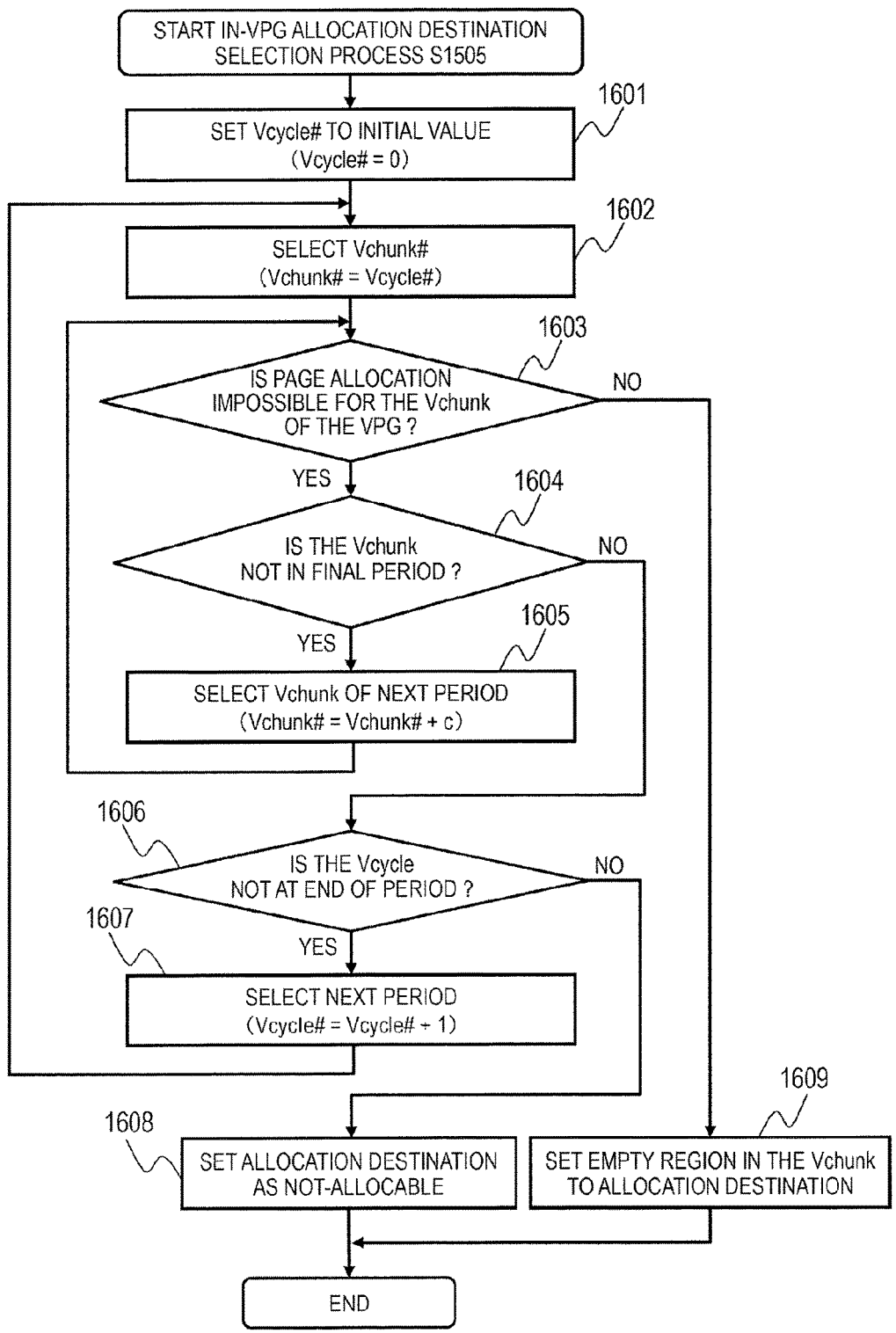
FIG. 16 shows an in-VPG allocation destination selection process of the computer system of Embodiment 1.

FIG. 16 shows the in-VPG allocation destination selection process (step 1505) of the computer system of Embodiment 1. The in-VPG allocation destination selection process is executed as a part of the page allocation process of FIG. 15, and allocation is performed for the page with the smallest Vcycle# among the unallocated pages in the VPG.

First, the page allocation processing program 902 sets an initial value to the Vcycle# (Vcycle#=0) (step 1601). Next, the page allocation processing program 902 selects the current Vchunk# (step 1602). The Vchunk# (c*K) to Vchunk# (c*(K+1)−1) is defined as the Vchunk period# K. The Vchunk# for the Vchunk period#0 is equal to the Vcycle#, and thus, the page allocation processing program 902 may plug in the current Vcycle# to the Vchunk# in step 1602.

Next, the page allocation processing program 902 determines whether page allocation is possible in the Vchunk# determined in step 1602 in the VPG (step 1603). In order to determine whether page allocation is possible, the page allocation processing program 902 may refer to the page mapping table 805 and confirm that pages corresponding to the Vchunk# of the VPG# 1203 are not allocated, and refer to the converted spare region management table 803a to confirm that the Vcycle# is less than the spare Vcycle# 1102.

If page allocation is possible (step 1603: NO), the page allocation processing program 902 selects an empty page in the Vchunk for the allocation destination (step 1609) and terminates the process.

If page allocation is not possible (step 1603: YES), then the page allocation processing program 902 determines whether the Vchunk is in the last Vchunk period. In order to determine whether the Vchunk is in the last Vchunk period, the page allocation processing program 902 may determine whether the Vchunk period# calculated from the Vchunk# matches the number of periods of the physical storage drive 180.

The number of periods (number of Pchunk periods) in the physical storage drive 180 can be calculated by calculating the final LBA from the capacity of the physical storage drive 180 and then using the following formula: number of periods=Floor (LBA/(parcel size*(c+1))).

If the Vchunk is not in the last Vchunk period (step 1604: YES), the page allocation processing program 902 selects the Vchunk# of the next Vchunk period# and then performs the determination of step 1603 again. The Vchunk# (next) of the next Vchunk period# can be calculated on the basis of the current Vchunk# (current) by Vchunk# (next)=Vchunk# (current)+c.

If the Vchunk is not in the last Vchunk period (step 1604: NO), the page allocation processing program 902 checks whether the Vcycle is at the end of the Vchunk period (step 1606). In order to determine whether the Vchunk is at the end of the Vchunk period, the page allocation processing program 902 refers to the converted spare region management table 803a.

If a NaN is stored in the spare Vcycle# 1102 of the DG# 1100, the page allocation processing program 902 determines that when the Vcycle# is c−1, the Vchunk is at the end of the Vchunk period.

If a value other than a NaN is stored in the spare Vcycle# 1102 of the DG# 1100, the page allocation processing program 902 determines that when the Vcycle# is the spare Vcycle# 1102 minus 1, the Vchunk is at the end of the Vchunk period. As described above, in the Vchunk period 504, Vchunks are sequentially allocated to the VVOL starting with the first Vchunk, and are sequentially converted to spare regions starting with the last Vchunk.

If the Vcycle# is not at the end of the Vchunk period (step 1606: YES), the page allocation processing program 902 selects the next Vchunk period# (step 1607) and then selects the Vchunk# again (step 1602). In order to select the next Vchunk period#, the page allocation processing program 902 may increment the current Vcycle#. If the Vcycle# is at the end of the Vchunk period (step 1606: NO), the page allocation processing program 902 sets the allocation destination to non-allocable (step 1608).

Figure 17:
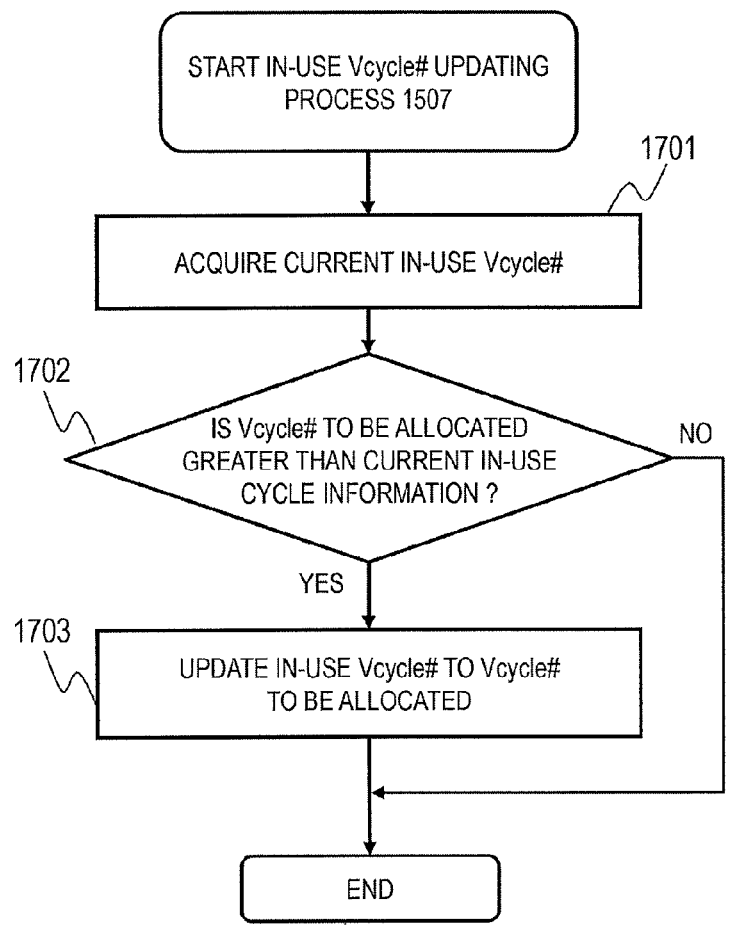
FIG. 17 shows an in-use Vcycle# updating process of the computer system according to Embodiment 1.

FIG. 17 shows an in-use Vcycle# updating process (step 1507) of the computer system according to Embodiment 1, which is executed as a portion of the page allocation process of FIG. 15. The in-use Vcycle# updating process determines whether or not updating of the in-use Vcycle# is necessary, and updates the in-use Vcycle# as necessary.

First, the page allocation processing program 902 refers to the converted spare region management table 803a and acquires the in-use Vcycle# 1101 corresponding to the DG# 1100 (step 1701). Next, the page allocation processing program 902 determines whether the Vcycle# to be allocated is greater than the Vcycle# acquired in step 1701.

If the Vcycle# to be allocated is greater than the Vcycle# acquired in step 1701 (step 1702: YES), then the page allocation processing program 902 updates the in-use Vcycle# 1101 corresponding to the DG# 1100 of the converted spare region management table 803a to the Vcycle# to be allocated (step 1703) and terminates the process.

If the Vcycle# to be allocated is less than or equal the Vcycle# acquired in step 1701 (step 1702: NO), then the page allocation processing program 902 simply terminates the process.

Figure 18:
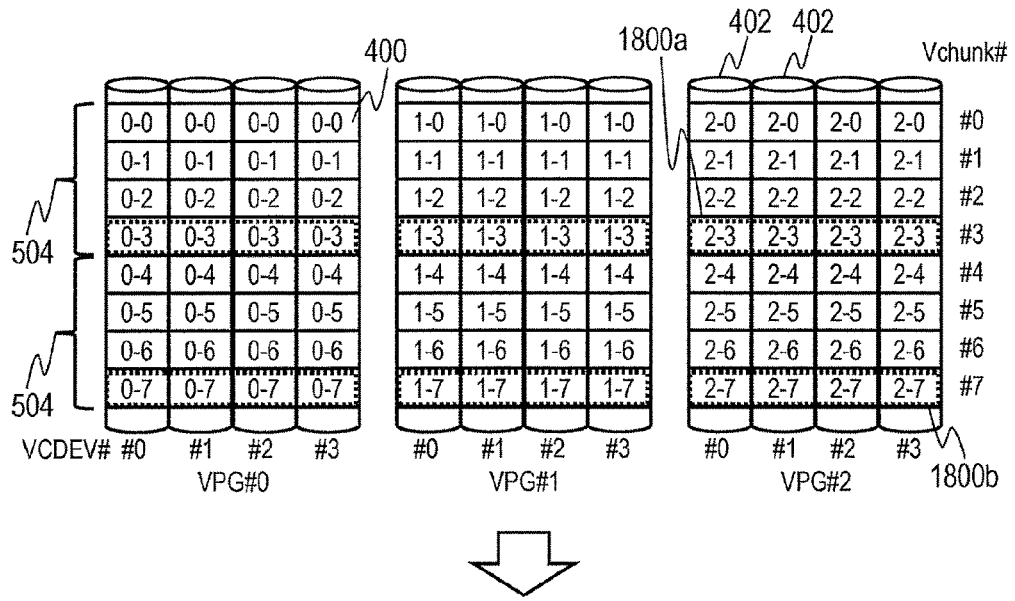
FIG. 18 shows a process of preventing allocation of an empty region in a VPG in the computer system according to Embodiment 1.
Figure 18:
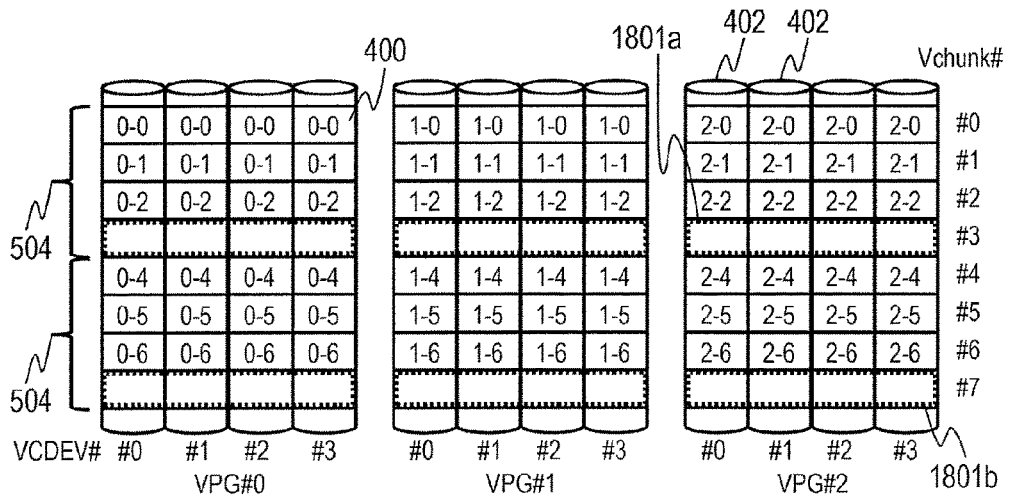
Figure 19:
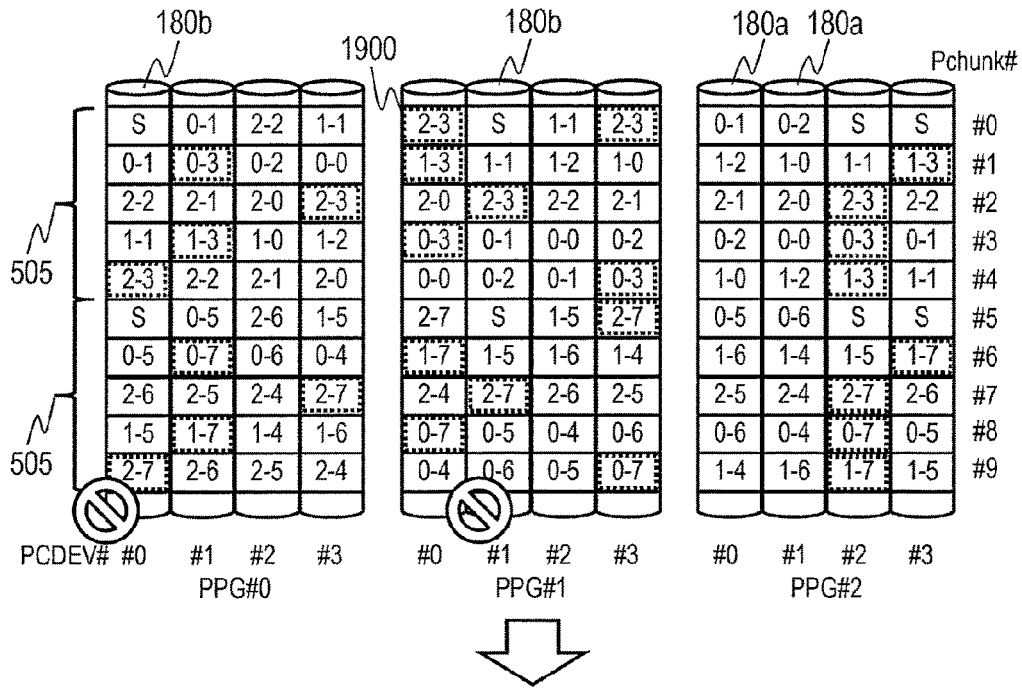
FIG. 19 shows the concept of a process of converting a portion in a VPG to a spare region in the computer system of Embodiment 1.
Figure 19:
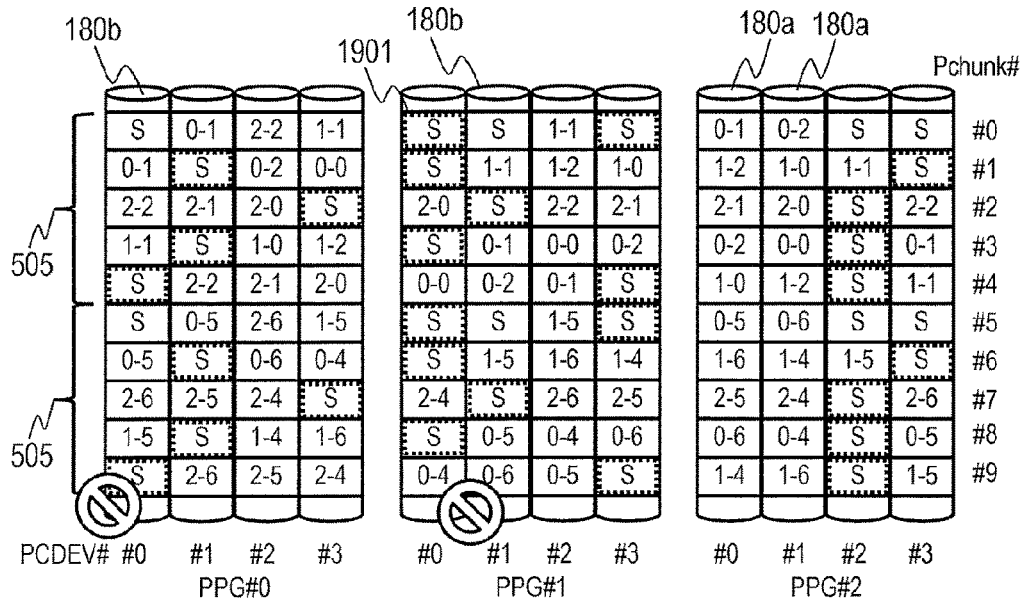

FIGS. 18 and 19 show the concept of a process of converting a portion in the VPG to a spare region in a computer system of Embodiment 1. In FIGS. 18 and 19, an example is shown in which c=4, N=4, and PG=3. FIG. 18 shows an example of converting to a spare region the Vchunk 401 with a Vcycle# of 3, which is the last Vchunk of the Vchunk period 504, or in other words, the Vchunk# 3 (1800a) and Vchunk# 7 (1800b), and preventing allocation thereof to the VVOL.

FIG. 19 shows a state in which a parcel 1900 on the PPG 205, which corresponds to the parcel belonging to the Vchunk 401 for which allocation is prevented in FIG. 18, is converted to the parcel 1901 of the spare region. FIG. 19 indicates that the parcel 1900 newly converted to a spare region is periodically present for each Pchunk period 505. In other words, in each PPG, the address position of the parcel that was newly converted to a spare region is common for all Pchunk periods 505.

Figure 20:
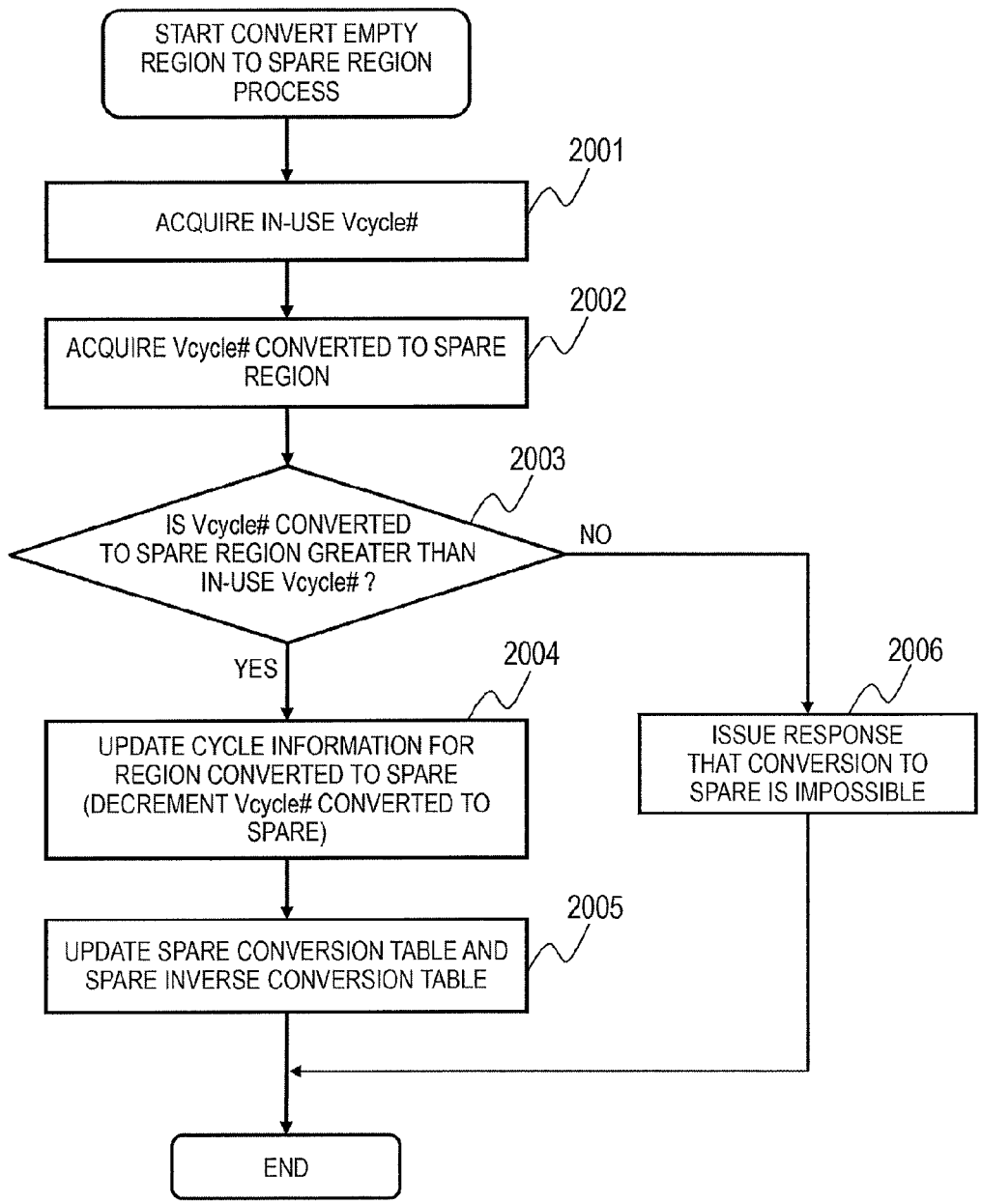
FIG. 20 shows a process of converting an empty region to a spare region in the computer system of Embodiment 1.

FIG. 20 shows the process of converting an empty region to a spare region in the computer system of Embodiment 1. The spare region conversion processing program 906 executes an empty region spare conversion process. The empty region spare conversion process updates management information for regions converted to spare regions after selecting the region to be converted to a spare region. The empty region spare conversion process is executed automatically if the amount of empty spare regions is zero or below a threshold, or executed by a manager by issuing an instruction through the management server 20 and the maintenance I/F 112 to increase the spare region.

First, the spare region conversion processing program 906 refers to the converted spare region management table 803a and acquires the in-use Vcycle# 1101 corresponding to the DG# 1100 (step 2001). Next, the spare region conversion processing program 906 acquires the Vcycle# 1102 that was converted to a spare region (step 2002).

The spare region conversion processing program 906 determines whether the Vcycle# 1102 that was converted to a spare region is greater than the in-use Vcycle# 1101 (step 2003). If the Vcycle# 1102 that was converted to a spare region is greater than the in-use Vcycle# 1101 (step 2003: YES), then the Vchunk can be converted to a spare region. The spare region conversion processing program 906 updates the spare region conversion cycle information (step 2004).

Specifically, the spare region conversion processing program 906 updates the Vcycle# 1102 that has been converted to a spare region in the converted spare region management table 803a to a value equal to the current value minus 1. In this manner, the Vcycle# is handled as a spare region thereafter, and new page allocation is prevented.

Next, the spare region conversion processing program 906 updates the spare conversion table 811 and the spare inverse conversion table 812 (step 2005). Specifically, if the physical parcel on the PPG 205 corresponding to the Vcycle# converted to a spare region is the spare origin, then the spare region conversion processing program 906 converts the value of the spare destination field corresponding to the spare origin physical parcel to a NaN in the spare conversion table 811. In this manner, the spare region is reverted to an unused state.

Additionally, the spare region conversion processing program 906 adds an entry of the new spare region to the spare inverse conversion table 812. Information of the physical parcel on the PPG 205 corresponding to the Vcycle# converted to a spare region is stored in the PPG# 1305, the PCDEV# 1306, and the Pcycle# 1307. A NaN is stored in the VSD# 1308 and the Pcycle# 1309.

If the Vcycle# 1102 that was converted to a spare region is less than or equal to the in-use Vcycle# 1101 (step 2003: NO), then the Vchunk cannot be converted to a spare region. The spare region conversion processing program 906 issues a response to the request origin that conversion to a spare region is impossible.

When converting two or more Vcycle#s to spare regions, the spare region conversion processing program 906 may repeat the above process a plurality of times.

The empty region spare conversion process reduces the usable data capacity in the storage drive 180 by an amount equal to the capacity converted to a spare region. Thus, if by the process above, the empty capacity decreases to below a threshold set in advance by a manager or below a necessary empty capacity threshold estimated from the allocated capacity increase trend or the like, then the process may be prevented from taking place even if there is an empty region.

In the above example, the empty region is converted to a spare region, but if, for example, the failed drive is exchanged for an operation drive and a copy-back process is performed, then the region converted to a spare region in the empty region spare conversion process may be reverted to a data region where new page allocation is once again possible (converted to an empty region). In such a case, the opposite process to the empty region spare conversion process is performed.

The process of converting a spare region to an empty region may be executed automatically whenever performing copy-back if the remaining spare capacity is greater than a threshold set in advance. The process converting a spare region to an empty region may be executed in response to spare region to be converted to an empty region being designated by a manager through a management screen. By converting the spare region to an empty region, if the spare capacity becomes less than a threshold set by the manager, the storage apparatus 100 may deter mine that the spare region cannot be converted to an empty region.

Figure 21:
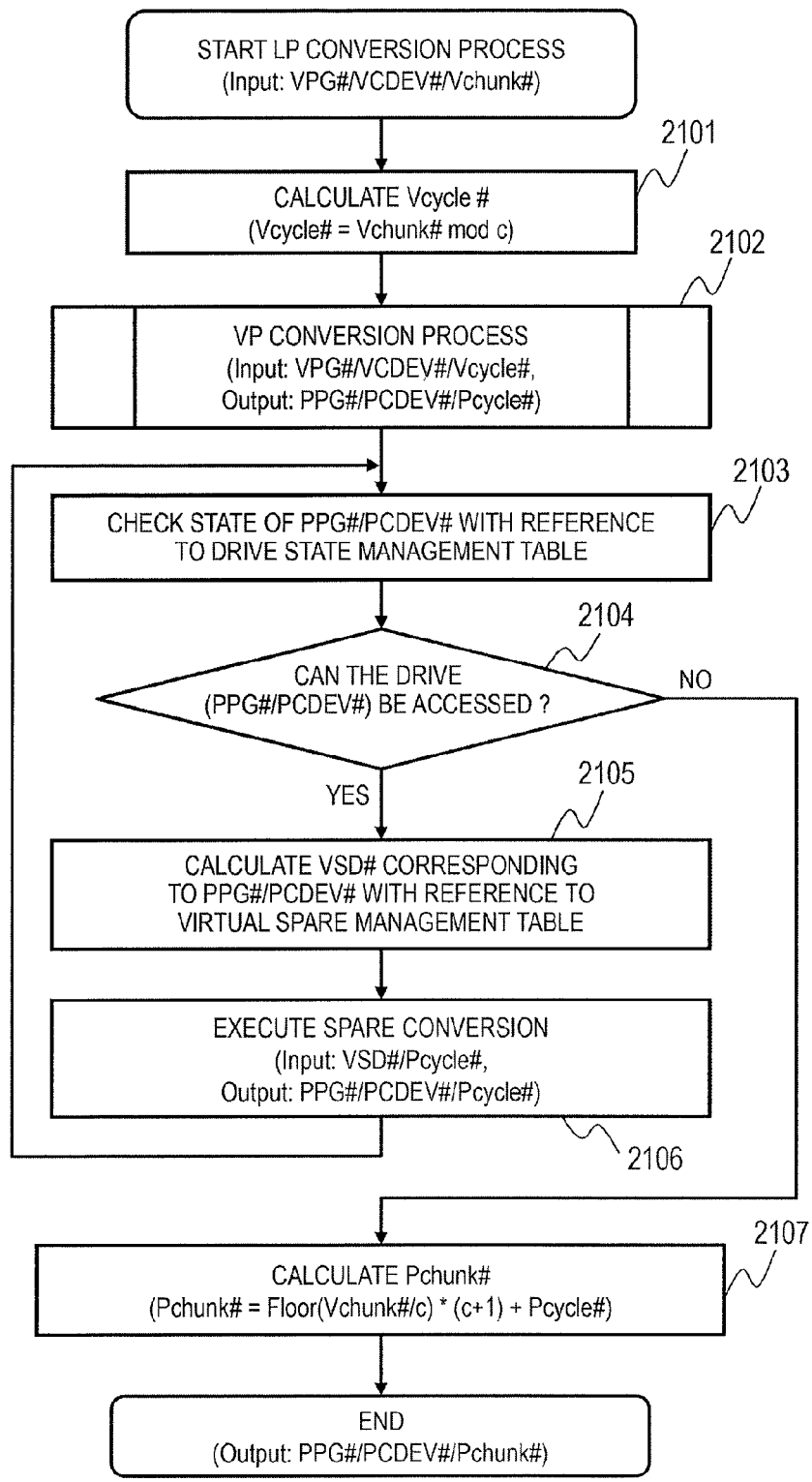
FIG. 21 shows an LP conversion process of the computer system of Embodiment 1.

FIG. 21 shows an LP conversion process of the computer system of Embodiment 1. The LP conversion process is executed by the LP conversion processing program 904. LP conversion is a process of converting a logic storage region to a physical storage region. The LP conversion process is called by a page conversion process for when I/O is received from the host 10. The LP conversion process converts a VPG space address, which is a designated virtual address (VPG#, VCDEV#, Vchunk#) to a PPG space address (PPG#, PCDEV#, Pchunk#) that is a physical data storage destination.

First, the LP conversion processing program 904 calculates the Vcycle# from the Vchunk# (step 2101). The Vcycle# can be calculated by Vcycle#=Vchunk# mod c.

Next, the LP conversion processing program 904 executes a VP (virtual-physical) conversion process (step 2102). By referring to the Vcycle mapping table 807 and the VCDEV mapping table 809, the LP conversion processing program 904 calculates the PPG#, the PCDEV#, and the Pcycle# for a regular physical address, that is, for when the drive is not failed, from the VPG#, the VCDEV#, and the Vcycle#. This conversion process is also disclosed in Patent Document 2, for example.

Next, the LP conversion processing program 904 refers to the drive state management table 804 and acquires the state 1105 of the drive, that is, the drive corresponding to the PPG# and PCDEV# calculated in step 2102 (step 2103). The LP conversion processing program 904 determines whether the state 1105 of the drive has changed to "inaccessible" (step 2104).

If the state 1105 of the drive has changed to "inaccessible" (step 2104: YES), then the data is saved in a spare region. Thus, the spare destination address needs to be calculated. The LP conversion processing program 904 acquires the VSD# 1005 corresponding to the PPG# and PCDEV# from the virtual spare management table 802 (step 2105).

Next, the LP conversion processing program 904 executes a spare conversion process (step 2106). The LP conversion processing program 904 refers to the spare conversion table 811 and acquires the PPG# 1302, the PCDEV# 1303, and the Pcycle# 1304 from the Pcycle# and the VSD# calculated in step 2105. Then the LP conversion processing program 904 again performs step 2103 for the calculated PPG#, PCDEV#, and Pcycle#.

If the state 1105 of the drive is "normal", that is, accessible (step 2104: NO), then a regular address or in other words the address of the PPG#, the PCDEV#, and the Pcycle# of the currently calculated value is used as the storage destination for the data. Therefore, the LP conversion processing program 904 calculates the Pchunk# using the calculated value (step 2107) and terminates the process. The Pchunk# can be calculated by the following formula: Pchunk#=floor (Vchunk#/c)*(c+1)+Pcycle#.

Figure 22:
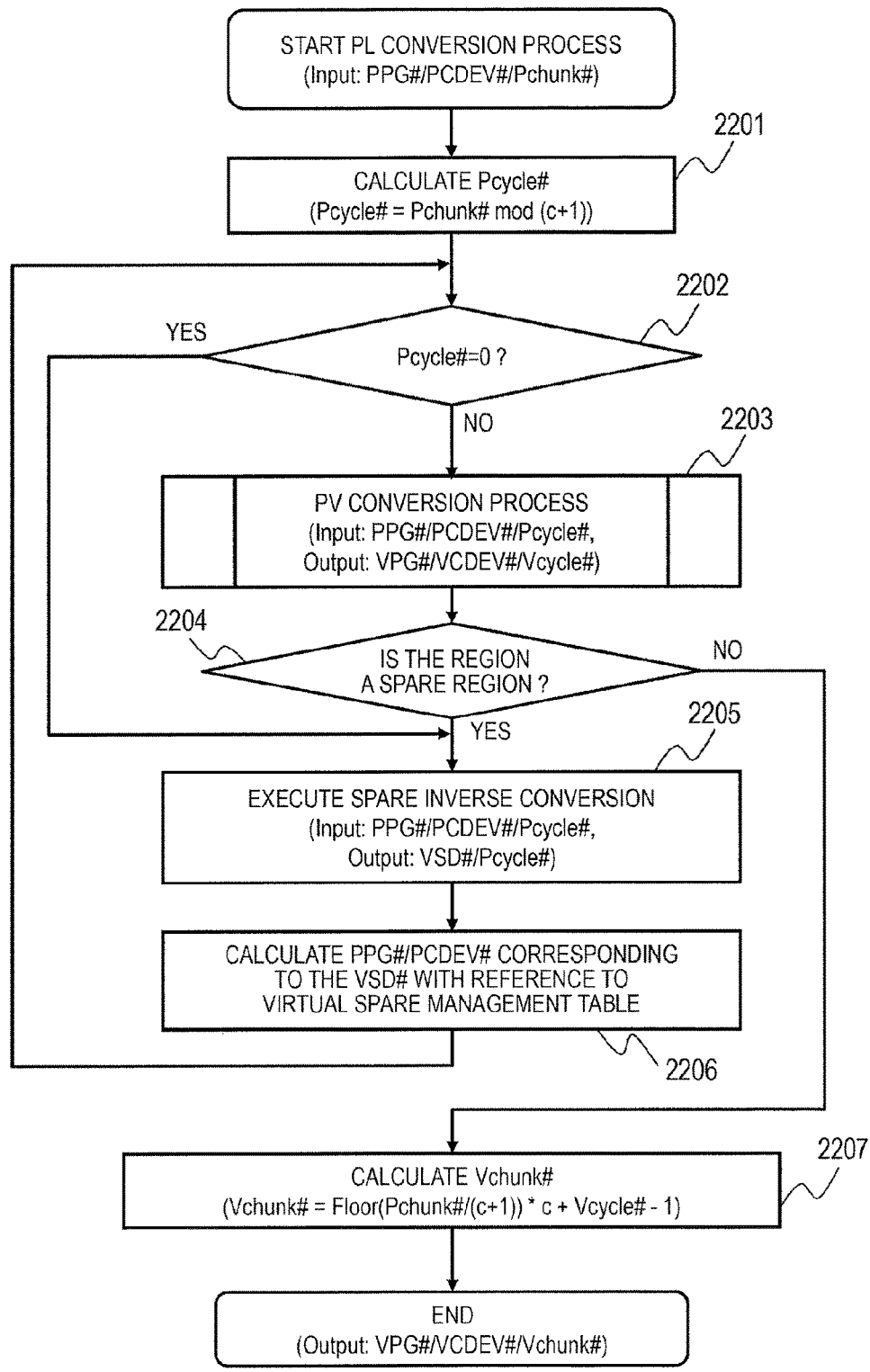
FIG. 22 shows a PL conversion process of the computer system of Embodiment 1.

FIG. 22 shows a PL conversion process of the computer system of Embodiment 1. The PL conversion process is executed by the PL conversion processing program 905. PL conversion is a process of converting a physical storage region to a logical storage region. PL conversion is a process used in order to identify the recovery origin of data in a failed region during the rebuilding process, and is called by the rebuild processing program 907.

The PL conversion process converts a PPG space address, which is the designated physical data storage destination (PPG#, PCDEV#, Pchunk#) to a VPG space address (VPG#, VCDEV#, Vchunk#) that is a virtual address. PL conversion is conversion performed in the inverse direction to LP conversion. In other words, if LP conversion is performed, and the results thereof are then subjected to PL conversion, the same address is returned. The inverse is also true.

First, the PL conversion processing program 905 calculates the Pcycle# from the Pchunk# (step 2201). The Pcycle# can be calculated by Pcycle#=Pchunk# mod (c+1).

Next, the PL conversion processing program 905 executes a PV (physical-virtual) conversion process (step 2202). By referring to the Pcycle mapping table 808 and the VCDEV mapping table 809, the PL conversion processing program 905 calculates the corresponding VPG#, the VCDEV#, and the Vcycle# from the PPG#, the PCDEV#, and the Pcycle#. This conversion process is also disclosed in Patent Document 2, for example.

Next, the PL conversion processing program 905 determines whether the region is a spare region (step 2203). If the Pcycle# is zero, or the Vcycle# calculated in the PV conversion process of step 2202 is greater than or equal to the spare Vcycle# 1102 corresponding to the DG# 1100 of the converted spare region management table 803*a*, then the PL conversion processing program 905 determines that the region is a spare region.

If the region is a spare region (step 2203: YES), then the PL conversion processing program 905 executes a spare inverse conversion process (step 2204). The PL conversion processing program 905 refers to the spare inverse conversion table 812 and acquires the VSD# 1308 and the Pcycle# 1309 from the PPG#, the PCDEV#, and the Pcycle#.

Then, the PL conversion processing program 905 acquires the PPG# 1006 and PCDEV# 1007 corresponding to the VSD# 1004 from the virtual spare management table 802 (step 2205). The PL conversion processing program 905 again performs determination of the PV conversion process of step 2202 for the calculated PPG#, PCDEV#, and Pcycle#. The process is repeated until a region other than spare regions is calculated.

If the region is not a spare region (step 2203: NO), the PL conversion processing program 905 calculates the Vchunk# (step 2206) and terminates the process. The Vchunk# can be calculated by the following formula: Vchunk#=Floor (Pchunk#/(c+1))*c+Vcycle#−1.

Figure 23:
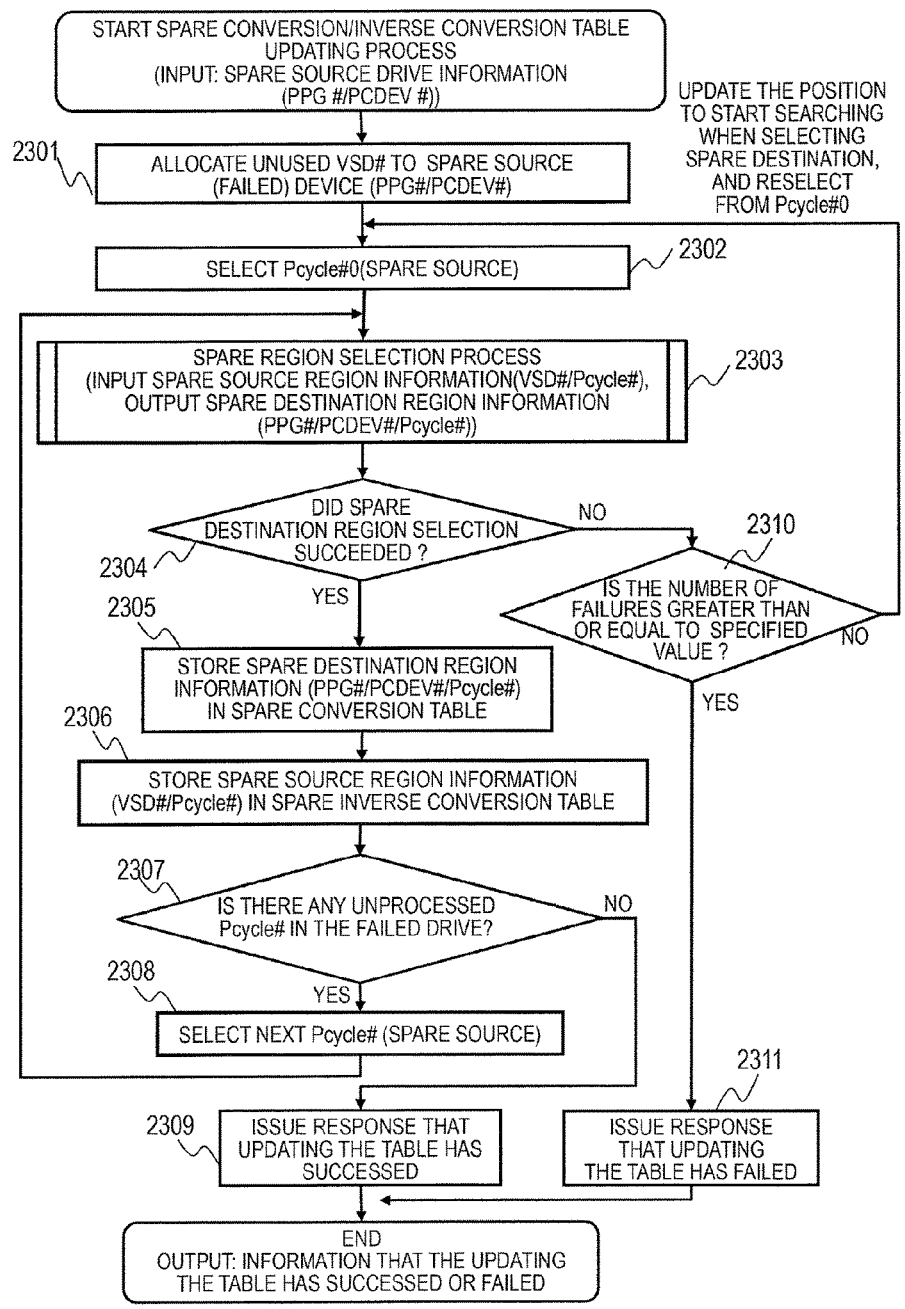
FIG. 23 shows a process of updating the spare conversion table and the spare inverse conversion table in the computer system of Embodiment 1.

FIG. 23 shows the process of updating the spare conversion table 811 and the spare inverse conversion table 812 in the computer system of Embodiment 1. The updating process for the spare conversion table 811 and the spare inverse conversion table 812 is executed by the spare conversion/inverse conversion table update processing program 908.

This process is executed at the first stage of the rebuilding process executed when the drive becomes inaccessible, and is called by the rebuild processing program 907. The process updates mapping information for the spare region to which data stored in the failed drive is to be saved and the virtual spare drive, that is, mapping information of the spare origin region and the spare destination region.

First the spare conversion/inverse conversion table update processing program 908 allocates an unused VSD# to the failed drive 180 (step 2301). Specifically, the spare conversion/inverse conversion table update processing program 908 refers to the virtual spare management table 802 and selects one virtual spare drive for which the state 1008 is "unused" among the virtual spare drives belonging to the DG 207 to which the PPG# 1006 corresponding to the failed drive 180 belongs.

Below, the spare conversion/inverse conversion table update processing program 908 selects spare destination regions sequentially for each Pcycle# in the failed drive 180. First the spare conversion/inverse conversion table update processing program 908 selects the Pcycle# 0 (step 2302).

Next, the spare conversion/inverse conversion table update processing program 908 selects a spare region in the PPG 205 to be the spare destination corresponding to the spare origin region (VSD#, Pcycle#) (step 2303). The spare destination selection process will be described later.

Then, the spare conversion/inverse conversion table update processing program 908 determines results of the spare destination selection process (step 2304). If the spare destination selection process fails (step 2304: NO), then the spare conversion/inverse conversion table update processing program 908 determines whether the number of failures is greater than or equal to a standard number of times in the spare conversion/inverse conversion table updating process. If the number of failures is less than the specified value (step 2310: NO), then the spare conversion/inverse conversion table update processing program 908 updates the search start position for when the spare destination is selected, and performs selection of the spare region again starting from the Pcycle# 0.

If the number of failures is greater than or equal to the specified value (step 2310: YES), then the spare conversion/inverse conversion table update processing program 908 issues a response to the request source that the table update has failed (step 2311), and terminates the process. The standard value may be set as the number of trial runs performed when performing a trial on search start positions when selecting a spare region for all parcels in the DG 207, for example.

If selection of the spare destination region is successful (step 2304: YES), then the spare conversion/inverse conversion table update processing program 908 sets the PPG#, the PCDEV#, and the Pcycle# selected in step 2303 in a region corresponding to the VSD# and the Pcycle# in the spare conversion table 811 (step 2305).

Additionally, the spare conversion/inverse conversion table update processing program 908 sets the VSD# and the Pcycle# in a region corresponding to the PPG#, the PCDEV#, and the Pcycle# selected in step 2303 in the spare conversion table 812 (step 2306).

By the above process, the spare destination for the Pcycle# is provisionally decided. Here, the phrase "provisionally decided" is used because if the spare destination selection process in following Pcycle#s (step 2303) fails at selecting the spare destination region, then there is a possibility that the provisionally decided spare destination needs to be reselected.

Next, the spare conversion/inverse conversion table update processing program 908 determines the presence or absence of Pcycle#s in the failed drive for which the spare destination determination process has not yet been performed (step 2307). If there are Pcycle#s in the failed drive for which the spare destination determination process has yet to be performed (step 2307: YES), the spare conversion/inverse conversion table update processing program 908 selects the next Pcycle# (step 2308) and performs the spare destination region selection process of step 2303 again.

If there are no Pcycle#s in the failed drive for which the spare destination determination process has yet to be performed (step 2307: NO), that is, if the spare destination selection of the Pcycle# c has been selected, the spare conversion/inverse conversion table update processing program 908 issues a response to the source of the request that table updating has succeeded (step 2309) and ends the process.

Figure 24:
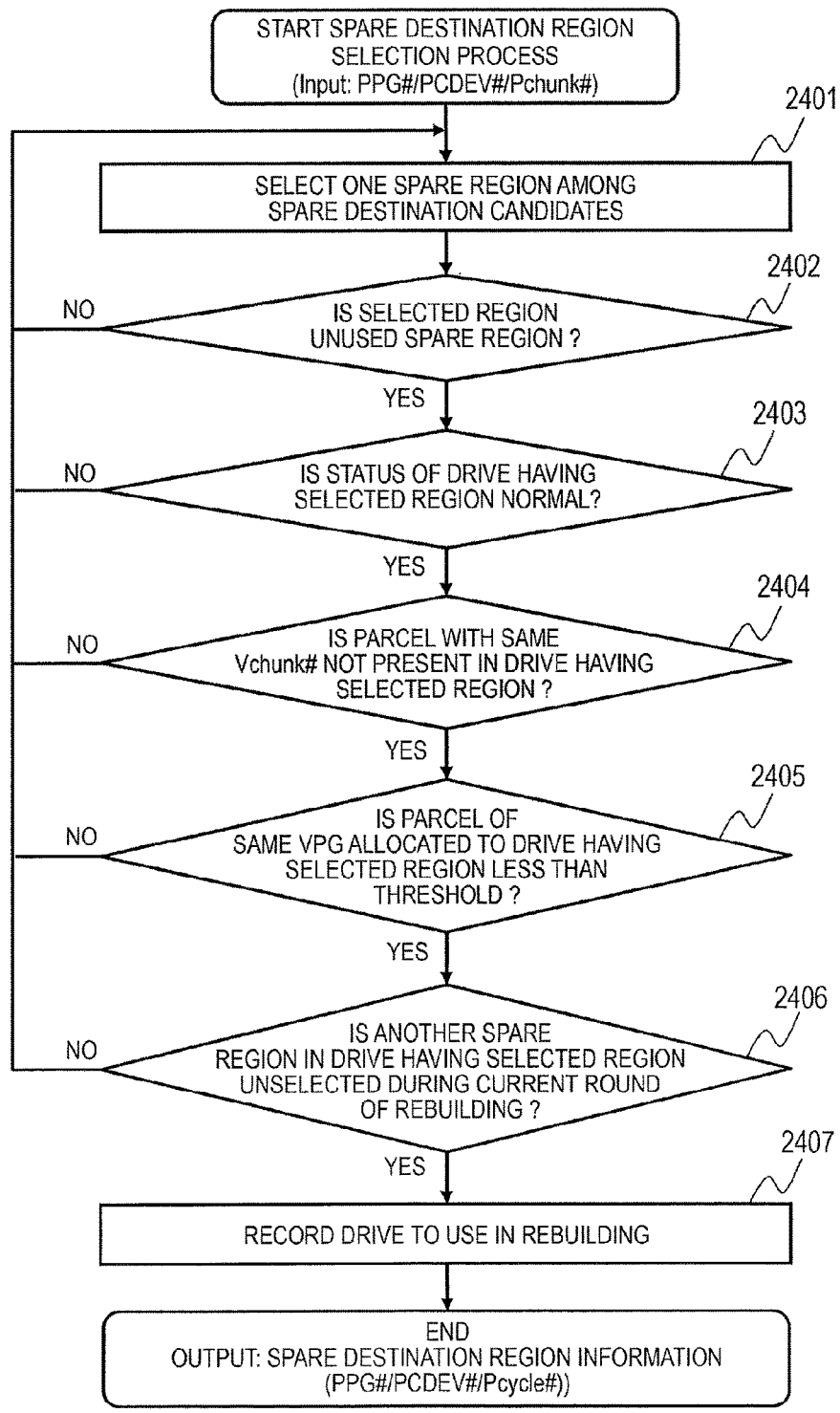
FIG. 24 shows a spare destination region selection process of the computer system of Embodiment 1.

FIG. 24 shows the spare destination region selection process (step 2303) of the computer system of Embodiment 1. The spare destination selection process determines which spare region in the DG 207 to store the data of the parcel to be converted to a spare region, and is executed as a portion of the spare conversion/inverse conversion table updating process of FIG. 23. In the spare destination selection process to be described below, the spare destination region can be selected such that the rebuild load and the I/O load is equal among drives.

First, the spare conversion/inverse conversion table update processing program 908 refers to the spare conversion table 811 or the spare inverse conversion table 812 and selects, as the spare region to be the spare destination candidate, one of the spare regions in the DG 207 (step 2401).

The spare destination candidate region is an initial position when selecting the spare destination region, and spare regions are searched in order from the spare destination candidate region. Below, the spare conversion/inverse conversion table update processing program 908 sequentially determines whether the spare destination candidate region is suitable as a spare destination.

The spare conversion/inverse conversion table update processing program 908 determines whether the selected spare region is unused (step 2402). Specifically, the spare conversion/inverse conversion table update processing program 908 confirms whether a NaN is stored in the spare origin region in the spare inverse conversion table 812.

If the selected spare region is in use (step 2402: NO), then the spare conversion/inverse conversion table update processing program 908 performs the selection of the spare destination candidate of step 2401 again.

If the selected spare region is not in use (step 2402: YES), then the spare conversion/inverse conversion table update processing program 908 determines whether the drive 180 in which the next selected spare region is present is an operation drive (step 2403). Specifically, the spare conversion/inverse conversion table update processing program 908 confirms whether the state corresponding to the PPG# and PCDEV# in the drive state management table 804 is "normal".

If the drive 180 in which the selected spare region is present has an anomaly (step 2403: NO), then the spare conversion/inverse conversion table update processing program 908 performs the selection of the spare destination candidate of step 2401 again.

If the drive 180 in which the selected spare region is present is operational (step 2403: YES), then the spare conversion/inverse conversion table update processing program 908 determines whether a parcel with the same Vchunk# is present in the drive 180 in which the next selected spare region is present (step 2404).

The spare conversion/inverse conversion table update processing program 908 performs the PL conversion process on all Pcycle#s in the drive having the selected spare region, and determines whether a parcel having a VPG# and Vchunk# that match the VPG# and Vchunk# of the spare origin parcel is present, for example.

If a parcel with the same Vchunk# is present in the drive 180 in which the selected spare region is present (step 2404: NO), then when the spare region is selected as the spare destination, the degree of redundancy of the stripe in the Vchunk 401 decreases by 2 all at once if a fault occurs in the drive 180 in which the spare region is present. In other words, even when the degree of redundancy of the stripe in the Vchunk is 1, a fault in one drive would result in data loss. As a result, necessary conditions for a RAID would not be satisfied. Thus, the spare conversion/inverse conversion table update processing program 908 performs the selection of the spare destination candidate of step 2401 again.

If the drive 180 in which the selected spare region is present does not have a parcel with the same Vchunk# (step 2404: YES), then the spare conversion/inverse conversion table update processing program 908 determines whether the number of parcels 400 in the same VPG 204 allocated to the drive in which the next selected spare region is present is less than a threshold prior to selection (step 2405).

The spare conversion/inverse conversion table update processing program 908 performs the PL conversion process on all Pcycle#s in the drive having the selected spare region, and counts the number of parcels having VPG#s that match the VPG#s of the spare origin parcels, for example.

If the number of parcels of the same VPG 204 allocated to the drive 180 in which the selected spare region is present is greater than or equal to a threshold (step 2405: NO), then if the spare region is selected as a spare destination, then the drive 180 is subject to many accesses when input/output is concentrated on the VPG 204, which creates a performance bottleneck. The threshold is Floor ((c+1)/PG), for example. If the selected region is selected as a spare destination when a number of parcels of the same VPG 204 greater than or equal to the threshold are allocated to the drive, this results in unbalance in allocation among PPGs 205.

Therefore, if the number of parcels of the same VPG 204 allocated to the drive 180 in which the selected spare region is present is greater than or equal to the threshold (step 2405: NO), then the spare conversion/inverse conversion table update processing program 908 performs the selection of the spare destination candidate of step 2401 again.

If the number of parcels 400 of the same VPG 204 allocated to the drive 180 in which the selected spare region is present is less than the threshold (step 2405: YES), then the spare conversion/inverse conversion table update processing program 908 determines whether another spare region in the drive 180 having the next selected spare region is already selected as a spare destination in the current round of the rebuild process (step 2406).

The spare conversion/inverse conversion table update processing program 908 confirms whether a drive having the spare region is present among drives registered in an in-use drive registering process of step 207 to be described later, for example.

If another spare region in the drive 180 in which the selected spare region is present has already been selected as a spare destination in the current rebuild process (step 2406: NO), then when the spare region is selected as a spare destination, this results in a bottleneck forming in the drive 180 where the spare region is present during the rebuild process, thus decreasing the rebuild speed. Thus, the spare conversion/inverse conversion table update processing program 908 performs the selection of the spare destination candidate of step 2401 again.

If another spare region of the drive 180 in which the selected spare region is present has not been selected as the spare destination in the current round of the rebuild process (step 2406: YES), then the spare conversion/inverse conversion table update processing program 908 registers the drive 180 to be used in the current round of the rebuild process (step 2407) and terminates the process. The registration information is used in the determination of step 2406.

The conditions of steps 2402, 2403, and 2404 are necessary conditions for selecting the spare destination, so spare regions in which any of the three conditions are not satisfied cannot be selected as a spare destination. On the other hand, the conditions of steps 2405 and 2406 are recommended conditions, and thus, either or both of the conditions may be omitted. If there are no spare regions that satisfy the conditions of steps 2401 to 2406, then a spare region may be selected that satisfies only the conditions of steps 2401 to 2403, or the conditions of steps 2401 to 2403 and step 2405 or 2406.

As described above, according to the present embodiment, it is possible to perform rebuilding in a short period of time without adding a spare drive or replacing a failed drive when there is insufficient spare capacity.

[Embodiment 2]

A computer system including a storage system according to Embodiment 2 will be described. The configuration of Embodiment 2 has portions in common with what is disclosed in Embodiment 1, and thus, in the description below, differences between Embodiments 1 and 2 will be described.

FIG. 25 shows the converted spare region management table 803b of the computer system of Embodiment 2. The converted spare region management table 803b manages whether the VPG 204 belonging to the DG 207 is used as a VPG for data to which page allocation is possible, or used as a spare VPG to which page allocation is impossible.

The converted spare region management table 804b includes the fields of a DG# 2501, a VPG# 2502, and a state 2503. The DG# 2501 stores the DG#. The VPG# 2502 stores VPGs corresponding to all VPGs included in the DG# 2501. The state 2503 stores either "for data", which indicates whether the VPG corresponding to the VPG# 2502 is for data for which page allocation is possible, or "for spare", which indicates that the VPG is for use as a spare. For VPGs with a state of "for spare", allocation of new VPG pages 203 is not possible.

The process of determining whether the spare region is a data region using the converted spare region management table 803a of Embodiment 1 can be replaced by the process of determining whether the VPG# is for use as a spare or for data using the converted spare region management table 803b of Embodiment 2.

Figure 26:
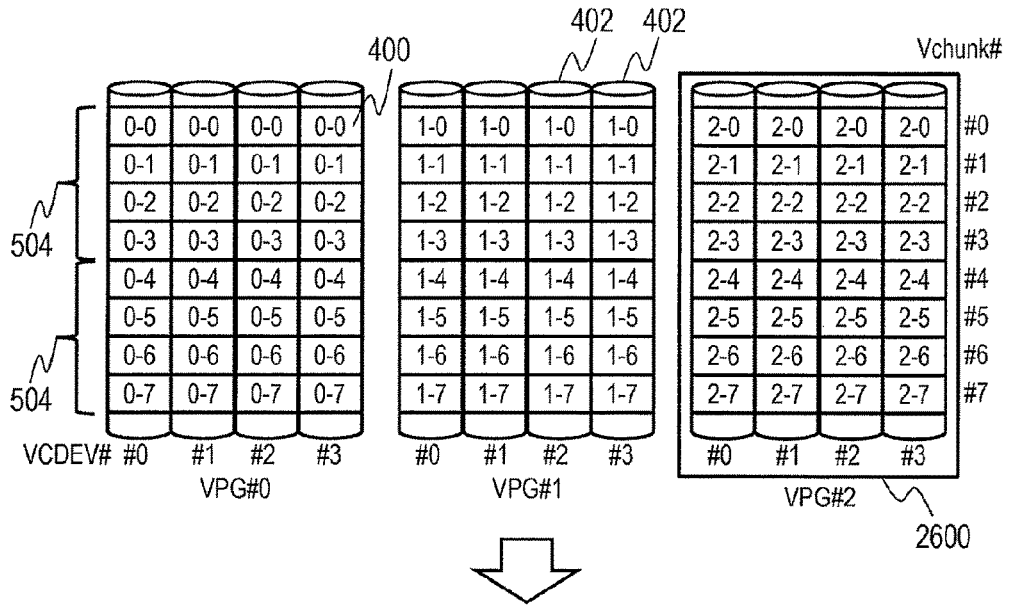
FIG. 26 shows the concept of a process of preventing allocation of an empty region in a VPG in the computer system according to Embodiment 2.
Figure 26:
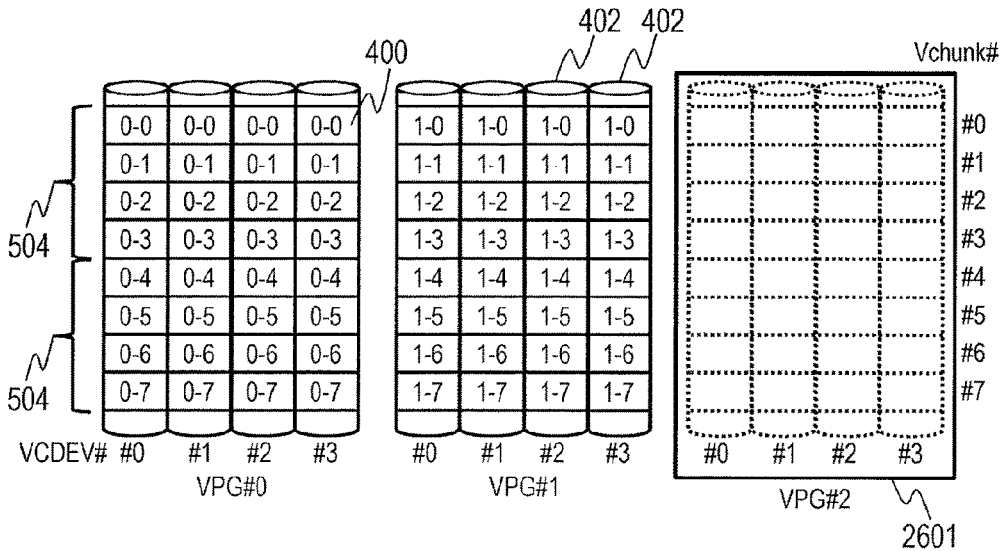
Figure 27:
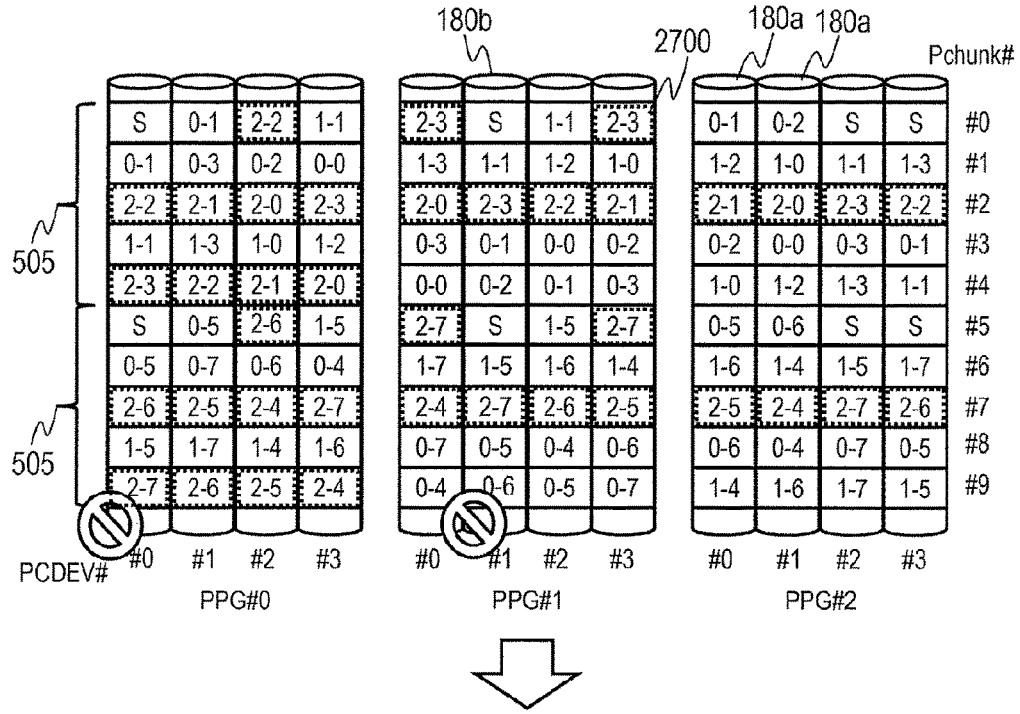
FIG. 27 shows the concept of a process of converting a portion in a VPG to a spare region in the computer system of Embodiment 2.
Figure 27:
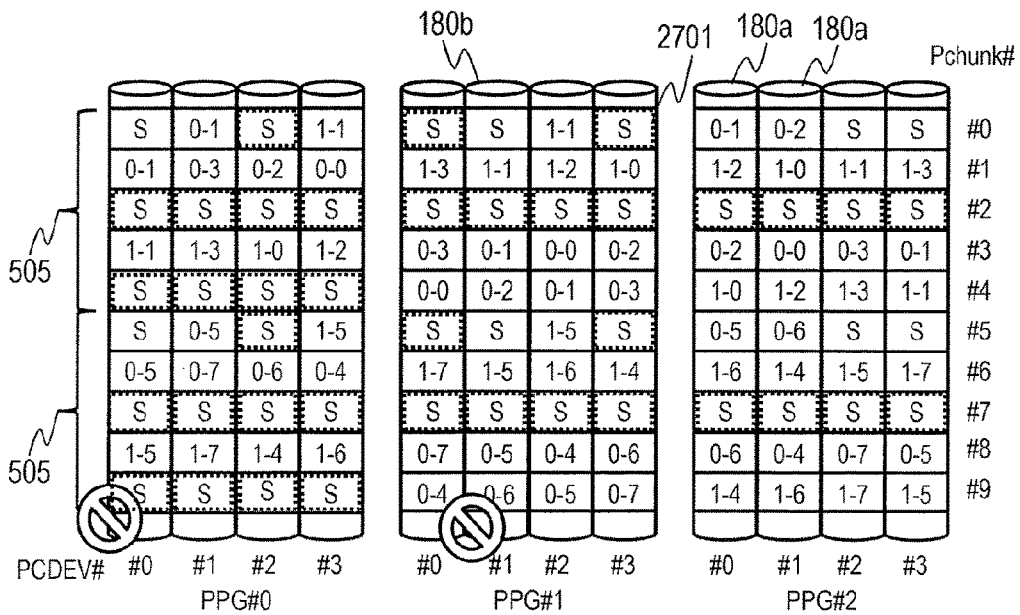

FIGS. 26 and 27 show the concept of a process of converting a portion of VPGs to a spare region in a computer system of Embodiment 2. In FIGS. 26 and 27, an example is shown in which c=4, N=4, and PG=3. FIG. 26 indicates a state in which the VPG# 2 (2600) is set to a VPG (2601) for which allocation is not possible.

FIG. 27 shows a state in which a parcel 2700 on the PPG 205, which corresponds to the parcel 400 belonging to the VPG 204 for which allocation is prevented in FIG. 26, is converted to the spare region 2701. In FIG. 27, the parcel 2701 newly converted to a spare region is periodically present for each Pchunk period 505. In other words, in each PPG, the arrangement of parcels 2701 that were newly converted to spare regions in the Pchunk period 505 is the same.

Figure 28:
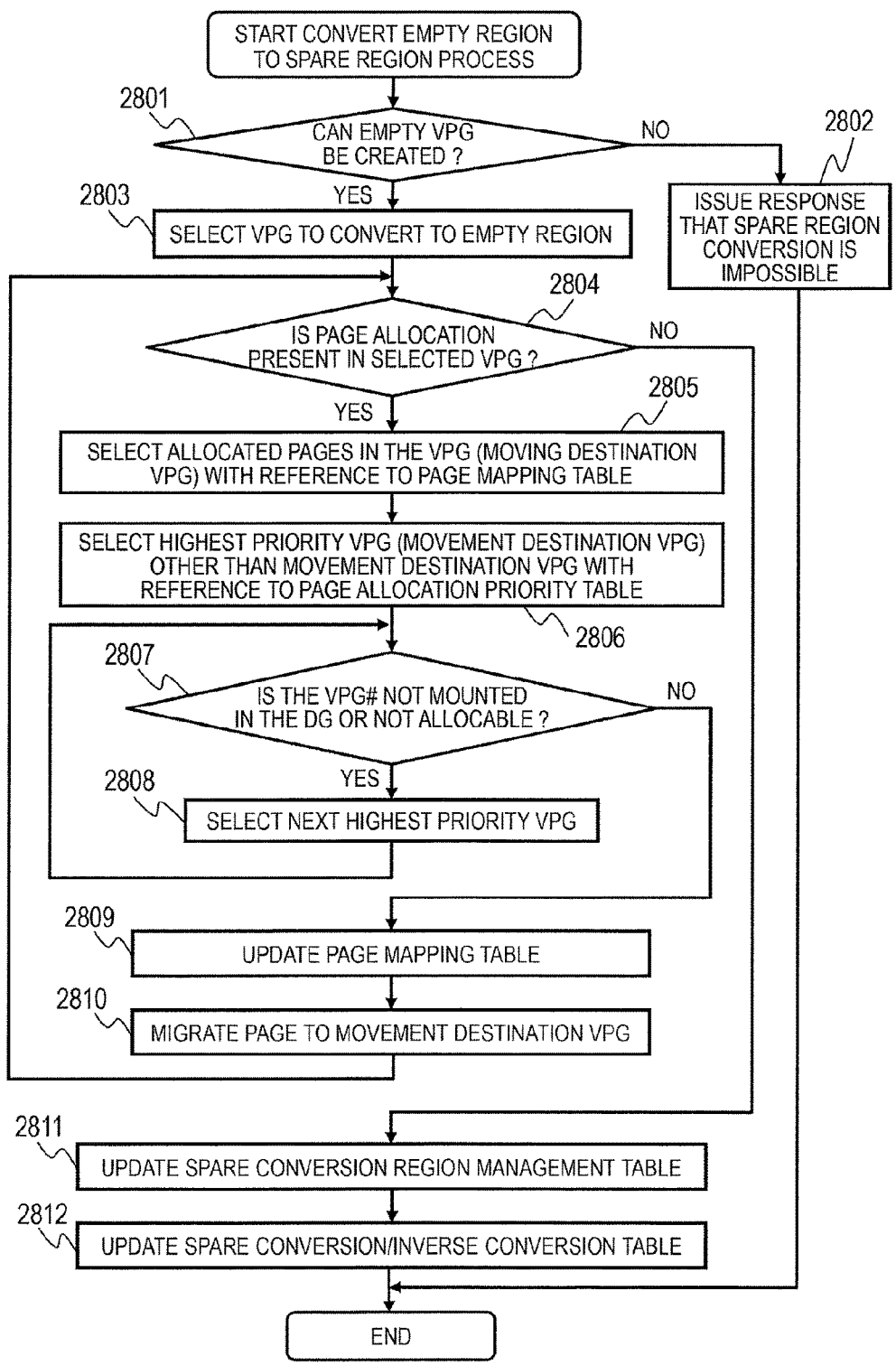
FIG. 28 shows an empty region spare conversion process in the computer system of Embodiment 2.

FIG. 28 shows the empty region spare conversion process in the computer system of Embodiment 2. The spare region conversion processing program 906 executes the empty region spare conversion process. The empty region spare conversion process updates management information for regions converted to spare regions after securing a region to be converted to a spare region by page migration. The empty region spare conversion process is executed automatically if the amount of empty spare regions is zero or below a threshold set in advance, or executed by a manager by issuing an instruction through the maintenance I/F 112 to increase the spare region.

First, the spare region conversion processing program 906 determines whether it is possible to create a VPG 204 to be converted to an empty region (step 2801). In order to create the spare region, an empty region having a size of at least 1 VPG or greater is required.

Thus, the spare region conversion processing program 906 determines whether an empty VPG 204 can be created according to the empty space in the DG 207. The spare region conversion processing program 906 acquires the total amount of pages allocated to the VPG 204 belonging to the DG 207 from the page mapping table 805, and determines whether the value calculated by subtracting the total allocated page amount from the total capacity of the DG is greater than or equal to the capacity of one VPG, for example.

If it is not possible to create an empty VPG (step 2801: NO), the spare region conversion processing program 906 issues a response to the source of the request that conversion to a spare region is impossible (step 2802), and the process is terminated.

If it is possible to create an empty VPG (step 2801: YES), the spare region conversion processing program 906 selects a VPG 204 to be converted to an empty region (step 2803). The standard by which to select the VPG 204 to be converted to an empty region in the DG 207 includes such standards as a VPG with the smallest number of allocated pages, a VPG with the smallest total number of I/Os per unit time, a VPG with the highest (or lowest) VPG#, or the like.

Then, the spare region conversion processing program 906 determines whether VPG pages 203 are allocated to the selected VPG (migration origin VPG) (step 2804). Specifically, the spare region conversion processing program 906 refers to the page mapping table 805 and determines whether VPG pages 203 allocated to the VPG are present.

If there are VPG pages 203 allocated to the selected migration origin VPG (step 2804: YES), the spare region conversion processing program 906 refers to the page mapping table 805 and selects one of the VPG pages 203 allocated to the migration origin VPG (step 2805).

Next, in order to select the migration destination VPG 204 of the selected VPG page 203, the spare region conversion processing program 906 refers to the page allocation priority table 806 and selects the highest priority VPG (migration destination VPG) aside from the migration origin VPG (step 2806).

Then, the spare region conversion processing program 906 determines whether migration of the VPG pages 203 to the migration destination VPG is possible (step 2807). Specifically, the spare region conversion processing program 906 determines whether the migration destination VPG is installed in the DG using the pool management table 801, and whether there are empty regions corresponding to the pages to be migrated in the migration destination VPG using the page mapping table 805.

If migration of the VPG pages 203 to the migration destination VPG is not possible (step 2807: YES), the spare region conversion processing program 906 refers to the page allocation priority table 806 and selects again the next highest priority VPG (migration destination VPG) (step 2808).

If migration of the VPG pages 203 to the migration destination VPG is possible (step 2807: NO), the spare region conversion processing program 906 migrates the VPG pages 203 to the migration destination VPG. Specifically, the spare region conversion processing program 906 updates the mapping destination VPG pages 1204 of the VVOL page# 1202 corresponding to the VPG pages 203 from the migration origin VPG to the migration destination VPG (step 2809), and copies data from the migration origin VPG to the migration destination VPG (step 2810).

By the process above, migration of one VPG page is completed. Thereafter, the spare region conversion processing program 906 returns to step 2804. The spare region conversion processing program 906 repeats the above process until migration is completed for of all VPG pages 203 allocated to the migration origin VPG and there are no VPG pages 203 allocated to the migration origin VPG.

If there are no VPG pages 203 allocated to the selected migration origin VPG (step 2804: NO), the spare region conversion processing program 906 changes the state 2503 corresponding to the VPG# of the converted spare region management table 803b from "for data" to "for spare" (step 2811). In this manner, no new page allocations can be made to the VPG 204.

Lastly, the spare region conversion processing program 906 calls the spare conversion/inverse conversion table update processing program 908, updates the spare conversion table 811 and the spare inverse conversion table 812, and terminates the process (step 2812). Updating of the spare conversion table 811 and the spare inverse conversion table 812 is similar to Embodiment 1 except that the parcels in the PPG 205 to be newly converted to spare regions differ.

If two or more VPG#s are converted to spare regions, the process may be executed a plurality of times. The empty region spare conversion process reduces the usable data capacity in the storage drive 180 by an amount equal to the capacity converted to a spare region. Thus, if by the process above, the empty capacity decreases to below a threshold set in advance by a manager or below a necessary empty capacity threshold estimated from the allocated capacity increase trend or the like, then the process may be prevented from taking place even if there is an empty region.

In the above example, the empty region is converted to a spare region, but if, for example, the failed drive is exchanged for an operation drive and a copy-back process is performed, then the region converted to a spare region in the empty region spare conversion process may be reverted to a data region where new page allocation is once again possible (converted to an empty region). In such a case, the opposite process to the empty region spare conversion process is performed.

The process of converting a spare region to an empty region may be executed automatically whenever performing copy-back if the remaining spare capacity is greater than a threshold set in advance. The process converting a spare region to an empty region may be executed in response to spare region to be converted to an empty region being designated by a manager through a management screen. By converting the spare region to an empty region, if the spare capacity becomes less than a threshold set by the manager, the storage apparatus 100 may determine that the spare region cannot be converted to an empty region.

According to the present embodiment, it is possible to generate many spare regions at once. By moving data stored in regions to be converted to spare regions to other regions, it is possible to generate many spare regions while avoiding data loss.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A computer system that provides a virtual volume to a host, comprising:
    an interface configured to transmit and receive data with the host through a network; and
    a control unit configured to control access to a physical storage drive from the host through the interface,
    wherein the control unit is configured to
        manage first mapping information between the virtual volume and a virtual storage region on a virtual storage drive, and second mapping information between the virtual storage region and a physical storage region provided by the physical storage drive, and convert access to the virtual volume to access to the physical storage region according to the first mapping information and the second mapping information,
        form a virtual parity group including a plurality of virtual storage drives,
        store a redundant data set in a virtual stripe array including virtual stripes that are virtual storage regions of a prescribed size of the plurality of virtual storage drives constituting the virtual parity group,
        map the virtual stripes of the virtual stripe array to different physical storage drives,
        form virtual chunks including one or more virtual stripe arrays in the virtual parity group,
        form a plurality of physical parity groups including a plurality of the physical storage drives,
        map the virtual stripes of the one or more virtual stripe arrays from the virtual chunks in a distributed manner to the plurality of physical parity groups,
        select one or more virtual chunks from among the virtual chunks, and
        convert the physical storage regions corresponding to the selected one or more virtual chunks to spare regions in the physical storage region.

2. The computer system according to claim 1,
    wherein the control unit is configured to
        form physical chunks including physical storage regions of a prescribed size of the physical storage drives forming one physical parity group,
        form a virtual chunk period including a plurality of virtual chunks in the virtual chunks,
        form a physical chunk period including a plurality of physical chunks in the physical chunks, use a common mapping pattern in the virtual chunk period and the physical chunk period for a plurality of pairs of mapped virtual chunk periods and physical chunk periods, and convert physical storage regions corresponding to the same position as the virtual chunks in the virtual chunk period to the spare regions.

3. The computer system according to claim 2,
wherein the control unit is configured to
allocate the virtual chunks to the virtual volume from one end of each virtual chunk period, and
convert the physical storage regions corresponding to the virtual chunks from another end of each virtual chunk period to the spare regions.

4. The computer system according to claim 1,
wherein the control unit is configured to select virtual chunks constituted of empty regions from among the virtual chunks and convert physical storage regions corresponding to the selected virtual chunks to the spare regions.

5. The computer system according to claim 1, further comprising:
a plurality of virtual parity groups,
wherein the control unit is configured to select a virtual parity group from among the plurality of virtual parity groups and convert physical storage regions corresponding to all virtual chunks in the selected virtual parity group to the spare regions.

6. The computer system according to claim 5,
wherein, if the redundant data set is stored in the selected virtual parity group, the control unit is configured to migrate the redundant data set to other virtual parity groups and then convert physical storage regions corresponding to all the virtual chunks in the selected virtual parity group to spare regions.

7. The computer system according to claim 1,
wherein the control unit is configured to rebuild the redundant data set in the spare regions such that mapping from the virtual parity group is less than a threshold in each physical storage drive.

8. The computer system according to claim 1,
wherein the control unit is configured to
rebuild spare origin data in a spare destination region for each piece of unit data, wherein the redundant data set includes a plurality of unit data and
select the spare destination regions such the spare destination regions are included in different physical storage drives.

9. The computer system according to claim 1,
wherein the control unit is configured to manage information indicating mapping between the spare regions and spare destination regions, and control access from the host with reference to the information indicating the mapping.

10. A method by which a computer system that provides a virtual volume to a host manages spare regions, comprising:
converting access to the virtual volume to access to a physical storage region provided by a physical storage drive according to first mapping information between the virtual volume and a virtual storage region on a virtual storage drive, and second mapping information between the virtual storage region and the physical storage region;
forming a virtual parity group including a plurality of virtual storage drives;

storing a redundant data set in a virtual stripe array including virtual stripes that are virtual storage regions of a prescribed size of the plurality of virtual storage drives constituting the virtual parity group;

mapping the virtual stripes of the virtual stripe array to different physical storage drives;

forming virtual chunks including one or more virtual stripe arrays in a same virtual parity group;

forming a plurality of physical parity groups including a plurality of the physical storage drives, mapping the virtual stripes of the virtual chunks in a distributed manner to the plurality of physical parity groups;

selecting one or more virtual chunks from among the virtual chunks; and converting the physical storage regions corresponding to the selected one or more virtual chunks to spare regions in the physical storage region.

11. The method according to claim 10, further comprising:
forming physical chunks including physical storage regions of a prescribed size of the physical storage drives forming one physical parity group;

forming a virtual chunk period including a plurality of virtual chunks in the virtual chunks;

forming a physical chunk period including a plurality of physical chunks in the physical chunks;

using a common mapping pattern in the virtual chunk period and the physical chunk period for a plurality of pairs of mapped virtual chunk periods and physical chunk periods, and converting physical storage regions corresponding to the same position as the virtual chunks in the virtual chunk period to the spare regions.

12. The method according to claim 11, further comprising:
allocating the virtual chunks to the virtual volume from one end of each virtual chunk period; and converting the physical storage regions corresponding to the virtual chunks from another end of each virtual chunk period to the spare regions.

13. The method according to claim 10, further comprising:
selecting virtual chunks constituted of empty regions from among the virtual chunks and converting physical storage regions corresponding to the selected virtual chunks to the spare regions.

14. The method according to claim 10, further comprising:
selecting a virtual parity group from among the plurality of virtual parity groups and converting physical storage regions corresponding to all virtual chunks in the selected virtual parity group to the spare regions.

15. The method according to claim 14, further comprising:
If the redundant data set is stored in the selected virtual parity group, migrating the redundant data set to other virtual parity groups and then converting physical storage regions corresponding to all the virtual chunks in the selected virtual parity group to the spare regions.

* * * * *